(12) United States Patent
Karem

(10) Patent No.: US 8,517,302 B2
(45) Date of Patent: Aug. 27, 2013

(54) AIRCRAFT WITH INTEGRATED LIFT AND PROPULSION SYSTEM

(76) Inventor: Abe Karem, N. Tustin, CA (US)

( * ) Notice: Subject to any disclaimer, the term of this patent is extended or adjusted under 35 U.S.C. 154(b) by 39 days.

(21) Appl. No.: 12/857,191

(22) Filed: Aug. 16, 2010

(65) Prior Publication Data

US 2011/0036955 A1     Feb. 17, 2011

Related U.S. Application Data

(60) Division of application No. 12/429,990, filed on Apr. 24, 2009, now abandoned, which is a continuation-in-part of application No. 11/505,067, filed on Aug. 15, 2006, now abandoned.

(60) Provisional application No. 60/708,805, filed on Aug. 15, 2005, provisional application No. 61/047,844, filed on Apr. 25, 2008.

(51) Int. Cl.
*B64C 27/52*     (2006.01)
*B64C 29/00*     (2006.01)

(52) U.S. Cl.
USPC ............................. 244/12.4; 244/7 C

(58) Field of Classification Search
USPC ..................... 244/6, 7 R, 7 C, 12.4
See application file for complete search history.

(56) References Cited

U.S. PATENT DOCUMENTS

| | | |
|---|---|---|
| 3,035,789 A | 5/1962 | Young |
| 3,106,369 A | 10/1963 | Borst |
| 3,141,633 A | 7/1964 | MacKay |
| 3,586,262 A | 6/1971 | Sherman |
| 5,046,684 A | 9/1991 | Wolkovitch |
| 5,085,315 A | 2/1992 | Sambell |
| 5,096,140 A | 3/1992 | Dornier, Jr. et al. |
| 6,260,793 B1 | 7/2001 | Balayn et al. |
| 6,311,106 B1 | 10/2001 | Dupont |
| 6,328,256 B1 | 12/2001 | Ryan et al. |
| 6,607,161 B1 | 8/2003 | Krysinski |
| 6,641,365 B2 | 11/2003 | Karem |
| 6,974,105 B2 | 12/2005 | Pham |
| 7,147,182 B1 | 12/2006 | Flanigan |
| 2005/0045762 A1* | 3/2005 | Pham ........................ 244/7 R |

OTHER PUBLICATIONS

"Speed of Sound at Different Altitudes" Fighter Planes and Military Aircraft, retrieved Nov. 30, 2012, available at http://www.fighterplanes.com/jetmach 1.htm.*
"Jane's All the World's Aircraft"; 2004-2005; pp. 578-581.
Acree, Jr; "Effects of Swept Tips on V-22 Whirl Flutter and Loads"; NASA/TM-2005-213458; May 2005; Ames Research Center, Moffett Field, California; pp. 1-50.
"V-22 Osprey": Global Security, Feb. 8, 2006, 79 pages, available at http://www.globalsecurity.org/military/systems/aircraft/v-22.htm.
"Correlation of Test and Analysis for the ⅕-Scale V-22 Aeroelastic Model", Presented at the American Helicopter Society 41st Annual Forum, Fort Worth, TX, May 1985.

* cited by examiner

*Primary Examiner* — Joseph W Sanderson
(74) *Attorney, Agent, or Firm* — Fish & Associates, PC

(57) ABSTRACT

A vertical take off and landing (VTOL) aircraft is designed to be so efficient that it can be commercially competitive with runway dependent aircraft operating in a range of 100 to 1000 miles. Improvements include a high efficiency tilting rotor and wing design that enable both vertical takeoff and efficient high speed cruising, a high aspect ratio wing, and a variable speed propulsion system that is efficient in both hover and cruise flight. Preferred aircraft use thin inboard and outboard wings, thin rotor blades, and use efficient lightweight design to achieve unusually low empty weight fraction. Inventive methods include utilization of advanced design and analysis techniques, which allow for accurate prediction of an aircraft's physical behavior.

18 Claims, 12 Drawing Sheets

Figure 8

TR53 External Dimensions

| Wing | | Empenage | |
|---|---|---|---|
| Wing Spans | | Horizontal Section | |
| Total Span | 128 ft | Span | 30 ft |
| Inboard Span | 80 ft | Average Chord | 4 ft |
| Outboard Span (each) | 24 ft | Area | 120 sq ft |
| Wing Chords | | Thickness Ratio | 17% |
| Inboard Section at Fuselage Centerline | 10.1 ft | Type | All Moving |
| Inboard Section at Nacelle Centerline | 8.7 ft | Vertical Section | |
| Outboard Section at Nacelle Centerline | 7.8 ft | Span | 15 ft |
| Outboard Section at Tip | 2.53 ft | Average Chord | 4 ft |
| Wing Area | 1,000 sq ft | Area | 60 sq ft |
| Wing Aspect Ratio | 16.38 | Thickness Ratio | 17% |
| Wing Thickness | | Fuselage | |
| Inboard Section | 20.4% | Length | 109 ft |
| Outboard Section at Nacelle Centerline | 18% | Width | 13 ft |
| Outboard Section at Tip | 16% | Height | 13.6 ft |
| Wing Configuration | | | |
| Dihedral | | | |
| Inboard Section | 7º | | |
| Outboard Section | -11º | | |
| Sweep Angle | | | |
| Inboard Section | -5º | | |
| Outboard Section | 0º | | |
| Trailing Edge Flaps | | | |
| Flap Chord Ratio | 40% | | |
| Inboard Section | Slotted | | |
| Outboard Section | Upper Hinged | | |

Figure 11

| | | Unit Weight | Qty | Total Weight Passenger Version | Total Weight Cargo Version |
|---|---|---|---|---|---|
| Wing Group | | 6,079 | | | |
| | Basic Structure | 5,171 | 1 | 5,171 | 5,171 |
| | Secondary Structure | 908 | 1 | 908 | 908 |
| Rotor Group | | 3,597 | | | |
| | Blade LRU Assembly | 341 | 8 | 2,730 | 2,730 |
| | Hub SRU Assembly | 433 | 2 | 867 | 867 |
| Empenage Group | | 561 | 561 | 1 | 561 | 561 |
| Fuselage Group | | 8,969 | | | |
| | Basic Fuselage Structure | 4,926 | 1 | 4,926 | 4,926 |
| | Enclosures & Flooring | 1,612 | 1 | 1,612 | 1,612 |
| | Doors, Ramps, & Misc. | 2,431 | 1 | 2,431 | 2,431 |
| | Contingency | | | 808 | 808 |
| Alighting Gear Group | | 2,681 | 2,681 | 1 | 2,681 | 2,681 |
| Nacelle Group | | 1,172 | 1,172 | 1 | 1,172 | 1,172 |
| Propulsion Group | | 7,948 | | | |
| | Engine Installation | 3,948 | 1 | 3,948 | 3,948 |
| | Drive System | 4,000 | 1 | 4,000 | 4,000 |
| Flight Controls | | | | 1,550 | 1,550 |
| APU | | | | 220 | 220 |
| Instruments | | | | 130 | 130 |
| Electronics Group | | | | 2,400 | 2,400 |
| Avionics Group | | | | 700 | 700 |
| Furnishing/Eqpt. | | | | 450 | 450 |
| Interior Air Management | | | | 1,500 | 1,500 |
| Anti/Air_deicing Group | | | | 480 | 480 |
| Accommodations | | | | 7,209 | 2,210 |
| Total Weight Empty | | | | 46,253 | 41,254 |
| Crew, oil, unburnt fuel | | | | 1,747 | 1,747 |
| OWE | | | | 48,000 | 43,000 |
| Max Fuel Weight | | | | 10,000 | 34,000 |
| Additional Fuel Tanks and System | | | | 0 | 1,000 |
| Payload Weight | | | | 26,000 | 42,000 |
| Design Gross Weight | | | | 84,000 | 120,000 |
| Empty Weight Fraction | | | | 0.55 | 0.34 |

AIRCRAFT WITH INTEGRATED LIFT AND PROPULSION SYSTEM

This application is a divisional of U.S. application Ser. No. 12/429,990 filed Apr. 24, 2009 which is Continuation-In-Part of U.S. application Ser. No. 11/505,067 filed Aug. 15, 2006, which claims priority to U.S. Provisional Application No. 60/708,805 filed Aug. 15, 2005, and further claims priority to U.S. Provisional Application No. 61/047,844 filed Apr. 25, 2008, each of which is incorporated by reference herein in its entirety.

FIELD OF THE INVENTION

The field of the invention is high efficiency vertical takeoff aircraft.

BACKGROUND

Passenger transit can be broken down into categories based on the length of the trip as shown in FIG. 1. For short trip distances, under 2 miles, the transit modes of walking 110, and bicycling 120 are preferred: they require very little overhead (non-travel time associated with the trip, such as putting on shoes) but are very slow. For somewhat longer trips, between 2 and 200 miles, driving 130 is the preferred mode of travel. However, external factors such as rising fuel prices and increasing traffic congestion are driving down the speed of this travel mode and increasing its cost, especially relevant for trips over 100 miles. Fixed-wing air travel 140 offers high trip speeds, and is usually preferred for very long distances, over 1000 miles. However, there is a large overhead associated with this mode of travel, including travel to an airport, airport security lines, waiting for takeoff, and ground transport at the destination, all of which reduces the efficiency of traditional fixed-wing air transport for mid-range, or regional, trips between 100 and 1000 miles. As a result, there is a largely unmet need for fast, affordable regional transport 150.

Although the prior art seems to have appreciated the need for fast, affordable regional transport, the focus has mostly been on rail transit. Rail travel typically offers higher average speeds than car travel, but is constrained to operate within the bounds of fixed rail infrastructure. For regions with a dispersed population, including suburbanized regions, the cost of building rail infrastructure to connect a large percentage of the population is prohibitive.

VTOL (vertical take-off and landing) transport has also been attempted over the years for regional transport, and has clear potential advantages over rail travel. The ability to take off or land vertically enables passengers to start and finish their journey near their true origin or destination, be it an urban center or intersection of freeways. However, despite decades of attempts, successful VTOL transport remains elusive due to challenging technical obstacles. Among other things, prior art VTOL is prohibitively expensive to operate, has low flight speeds, limited ranges, is relatively fuel inefficient, and has a relatively poor safety record. This history is catalogued to some extent in the books "The Principles of Helicopters Aerodynamics", J. G. Leishman, 2006 and "The Helicopter: Thinking Forward, Looking Back", J. G. Leishman, 2007. Technical details about individual aircraft can be obtained from the book series "Jane's All the World's Aircraft" by referencing the appropriate volume.

These references, as well as all other extrinsic materials discussed herein, are incorporated by reference in their entirety. Where a definition or use of a term in an incorporated reference is inconsistent or contrary to the definition of that term provided herein, the definition of that term provided herein applies and the definition of that term in the reference does not apply.

In the void left by the lack of a viable regional transportation method, passengers are relegated to driving long distances in increasingly congested traffic, or flying regional fixed-wing transport aircraft and enduring long airport-related waits. There is little or no appreciation in the prior art that vertical take-off aircraft should or even could be modified to simultaneously have high flight speed, high fuel efficiency, and the ability to carry a substantial payload.

FIG. 2 shows a typical prior art tiltrotor aircraft 200 comprising a wing 202, a fuselage 204, and a first tilting rotor system 210 comprising a first rotor blade 212 and first nacelle 218 in aircraft cruise mode corresponding to a generally horizontal position of the nacelle 218. The aircraft is also equipped with a second tilting rotor system 220 on the opposite end of the wing 202. The second rotor system 220 is depicted in conversion from a horizontal position consistent with aircraft cruise mode to a vertical position consistent with helicopter mode.

In practice, nacelles 218, 228 on either side of the aircraft in prior art tiltrotors have a substantially identical tilt angle. The tilt angle 236 of a nacelle 228 is the angle 236 between the tilting nacelle axis 238 and the aircraft axis 234. In a typical tilt rotor aircraft 200, the nacelle 204 is also capable of operation in a generally vertical position used in helicopter mode flight. The nacelle 228 tilt angle 236 is usually affected using a tilt actuator and mechanism to convert from helicopter mode flight to aircraft cruise mode. A cross-shaft 206 is disposed within the wing 202 and runs between left and right nacelles 218, 228.

The aircraft of FIG. 2 has a relatively small fuselage, a relatively small wing aspect ratio, and has gimbaled rotors not capable of variable speed operation. It appears to have been optimized for the then-contemplated use of short-range transport with relatively few passengers, under which fuel efficiency and speed are not so important as vertical take-off capability and cost. There is nothing in the prior art indicating that those of ordinary skill in the art appreciated that vertical take-off aircraft should, or even could, be optimized for high fuel efficiency, while carrying a substantial payload.

The majority of prior art rotorcraft and prior art vertical takeoff aircraft are conventional helicopters. Conventional helicopters, such as the modern Sikorsky™ S-92, are severely limited in terms of cruise speed and efficiency. A conventional helicopter is lifted and propelled by the same predominantly horizontal rotor or rotor, one side of which advances into the oncoming flow, and one side of which retreats away from it. During cruise, the airspeed towards the tip the advancing rotor blade is much higher than that of the helicopter itself. It is possible for the flow near the tip blade to achieve or exceed the speed of sound, and thus produce vastly increased drag and vibration. This limits the forward speed of helicopters. Additionally, a rotor is an inefficient way to generate lift as compared to a wing, partially due to the dissymmetry of lift between advancing and retreating sides of the rotor.

A major step forward in the prior art was the tiltrotor configuration including, for example, the Bell™/Augusta™ BA609. Tilt-rotors represent a major step forward because they generate most or all of the lift necessary for cruise flight with a wing instead of rotors, which is considerably more efficient than rotor borne flight. Prior art tilt-rotors have had short, low-aspect ratio wings that were relatively thick because they had to support heavy rotor systems, which results in lower efficiency, L/D, as compared to fixed-wing aircraft.

Despite marginal increases in speed and forward flight efficiency of tilt-rotor aircraft relative to helicopters, the prior art tilt-rotors have failed to improve on the productivity (how fast one transports a payload) of conventional helicopters. This is because the ability of a modern tiltrotor to cruise up to 50% faster than a modern helicopter is almost entirely offset by its relatively higher empty weight fraction (aircraft empty weight divided by maximum hover takeoff weight, typically around 0.60-0.65 for prior art tilt-rotor) as compared to conventional helicopters.

Unless a contrary intent is apparent from the context, all ranges recited herein are inclusive of their endpoints, and open-ended ranges should be interpreted to include only commercially practical values. Similarly, all lists of values should be considered as inclusive of intermediate values unless the context indicates the contrary.

The complexity, resulting high cost, aerodynamic inefficiency, poor safety record, and weight criticality of rotorcraft conspire to make them entirely uncompetitive with fixed-wing aircraft. Modern prior art rotorcraft have a productivity, the product of payload carried and speed, about 5 times lower than modern turboprop airliners, as reported in the AHS Journal paper "Rotorcraft cost too much" by Harris and Scully.

In view of the existing prior art and present state of technology, and without access to the present inventive subject matter, a person of ordinary skill in the art attempting to design an advanced future tiltrotor transport would tend to make a smaller diameter conventional rotor to minimize the rotor system weight. This would result in higher rotor disc loading in hover, and would constrain the wing to be short and thick to prevent the whirl flutter aeroelastic instability resulting from heavy conventional rotors at higher speeds. Furthermore, the flight envelope would be constrained to lower speeds because of the thick wing, the efficiency would be reduced because of the short wing, and the cruise altitude would be capped by the small wing area.

In summary, what are still needed are: (1) an appreciation that VTOL transport systems could realistically be as efficient and productive as fixed wing aircraft for regional transport of substantial payloads; and (2) technologies that could be used to implement such systems. In order to implement those goals, an aircraft would realistically need to have some or all of the following characteristics:

a. Tailored, efficient aerodynamics, especially including the inner wing, rotor blade and nacelle shaping, for efficient cruise flight at speeds up to Mach 0.65 (100 knots faster than the prior art Bell™ V-22);

b. Wing area and wing airfoil technology (expressed as an $M^2C_L$ of at least 0.30-0.35) to provide for cruise flight at 35,000-41,000 feet (above most adverse weather and 10,000-16,000 feet higher than prior art tilt rotor aircraft);

c. Small empennage, low drag fuselage, low drag landing gear fairing and high aspect ratio wing to assist in providing a lift-to-drag ratio of 16-23 (3-4 times higher than the prior art Bell™ V-22);

d. Structures that support a very low aircraft empty weight fraction while sustaining rotor loads and providing the strength, stiffness, and durability of a high speed pressurized commercial transport (empty weight fractions 20-40% lower than in the non-pressurized prior art Bell™ V-22);

e. Mechanical systems that support the low aircraft empty weight fraction while sustaining rotor loads, and providing needed functionality;

f. A rotor system that provides a high cruise flight propeller efficiency at a cruise Mach number of 0.65 while also being capable of vertical takeoff; and g. Low hover download to reduce the amount of engine power required for hover. (less than 5% of rotor lift vs. 11% the prior art Bell™ V-22 tilt-rotor).

Ideally, such systems would carry at least 20,000 pounds of payload, have a wing sized and dimensioned to have a maximum wing loading of between 60 and 140 pounds per square foot, have a wing aspect ratio between 10 and 22, and be capable of sustained cruise flight with the first rotor operating at a rotational speed no greater than 75% of the operational maximum rotational speed.

SUMMARY OF THE INVENTION

The inventive subject matter provides apparatus, systems and methods in which an aircraft is equipped with tilting rotors that provide for vertical take off capability and propulsion in forward flight, and that is configured for high fuel efficiency and high speed while carrying a substantial payload.

In preferred embodiments, the rotors can operate in cruise flight at a rotational speed of at least 25% or even 40% slower than that used for hover flight, and the aircraft has a high aspect ratio wing, preferably between 10 and 22. In still more preferred embodiments the fuselage is sized and dimensioned to carry at least 20,000 pounds of payload, and the wing is sized and dimensioned to have a maximum wing loading of between 60 and 140 pounds per square foot. Especially preferred aircraft can cruise at speeds greater than Mach 0.5.

While all suitable wings are contemplated, preferred wings are relatively thin and unswept. For example, suitable wings could have a wing airfoil at mid span with a thickness ratio of between 19% and 22%, and could have a leading edge sweep angle of less than 15 degrees. It is contemplated that a single wing could carry first and second tilting rotors.

Rotors have blades that are preferably long and stiff, with a quarter-span thickness ratio of less than 22%, and having size and dimensions to hover the aircraft with a rotor disc loading of at most 60 pounds per square foot at a maximum hover weight. Rotors can advantageously be equipped with a spinner having a shaped region to slow local airflow in the vicinity of the blades. A preferred nacelle could have a spinner with a concave region with a diameter that is reduced by 3%, 5%, 10% or even more from a maximum spinner diameter.

The aircraft's fuselage is relatively small in comparison with the wing, for example having a frontal area that is between 10 and 16 percent of the planform area of the wing. Viewed from another aspect, the fuselage is sufficiently small that the aircraft has an empty weight that is at most 60% of the aircraft maximum hover weight. Preferred aircraft also have a relatively small empennage, where the wetted area of the empennage is between 14 and 40 percent of the wetted area of the wing.

All suitable power plants, gearboxes, and drive trains are contemplated. Especially preferred aircraft have a turbine engine sized and dimensioned to provide sufficient power to hover the aircraft, and also overcome an aerodynamic drag of the aircraft even in high-speed cruise flight mode. Preferred aircraft also have a fuel capacity sufficient to provide a maximum range of at least 1,000 miles while carrying its maximum payload.

Various objects, features, aspects and advantages of the inventive subject matter will become more apparent from the following additional description of preferred embodiments, along with the accompanying drawings in which like numerals represent like components.

BRIEF DESCRIPTION OF THE DRAWING

FIG. 8 is a table of selected dimensions of the aircraft of FIGS. 5-7.

FIG. 11 is a table containing preferred weights as calculated for two versions of the TR53 as verified using the analyses described above.

DETAILED DESCRIPTION

Physics of Efficient Flight

Figure 1:
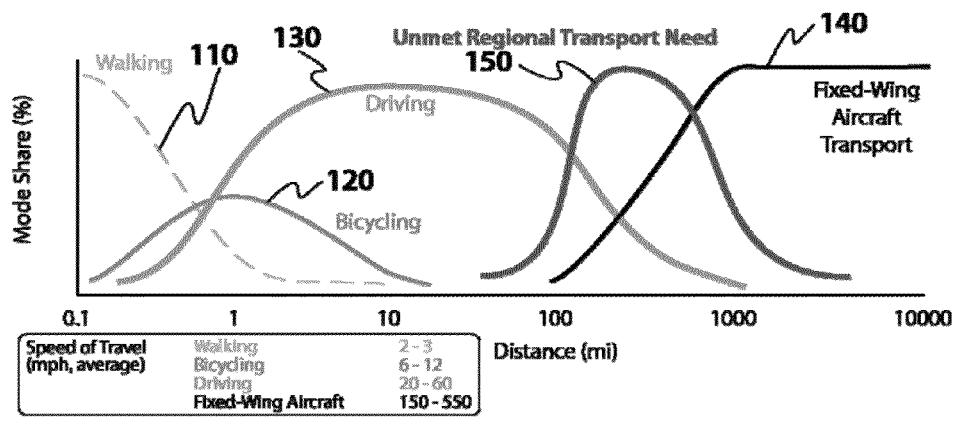
FIG. 1 is a graph depicting relative uses of different modes of travel.
Figure 2:
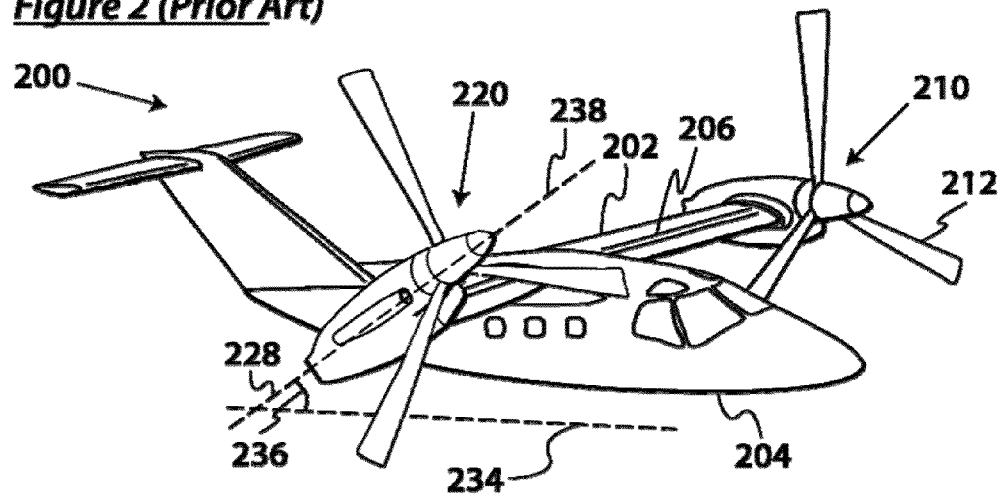
FIG. 2 is a perspective view of a typical prior art tiltrotor aircraft.
Figure 3:
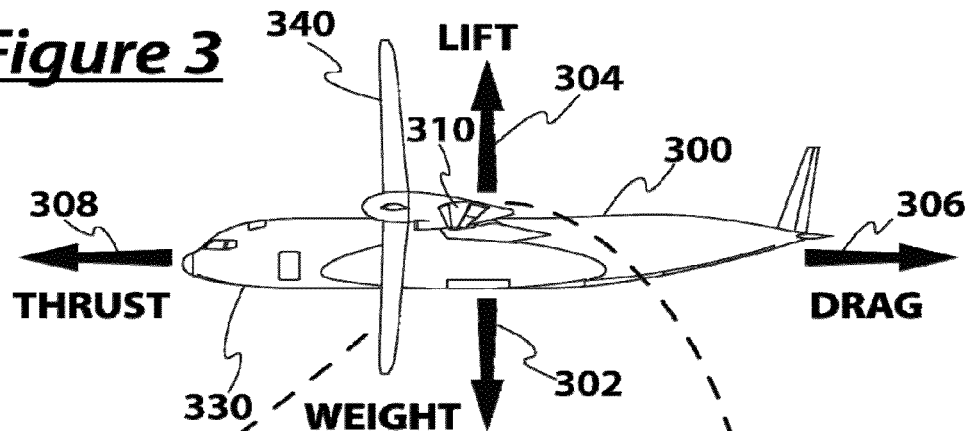
FIG. 3 is a side view of a preferred embodiment in flight, showing forces acting on the aircraft.

As shown in the side view illustration of FIG. 3, a preferred aircraft 300 in non-accelerated flight is in force equilibrium. Its weight 302 is balanced by the same amount of lift 304, and the aerodynamic resistance to its motion, drag 306, is countered by a propelling thrust 308. An aircraft in steady level equilibrium flight is said to be in cruise flight.

The generation of thrust requires energy, often produced via combustion in a turbine engine. Efficient flight minimizes the amount of energy added, or equivalently, the amount of fuel burned to maintain equilibrium flight.

Figure 3A:
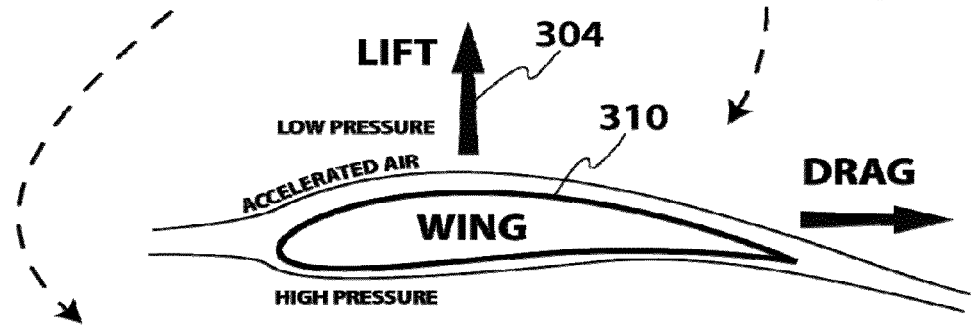
FIG. 3A is a schematic cross-section of a wing of the aircraft of FIG. 3.
Figure 3B:
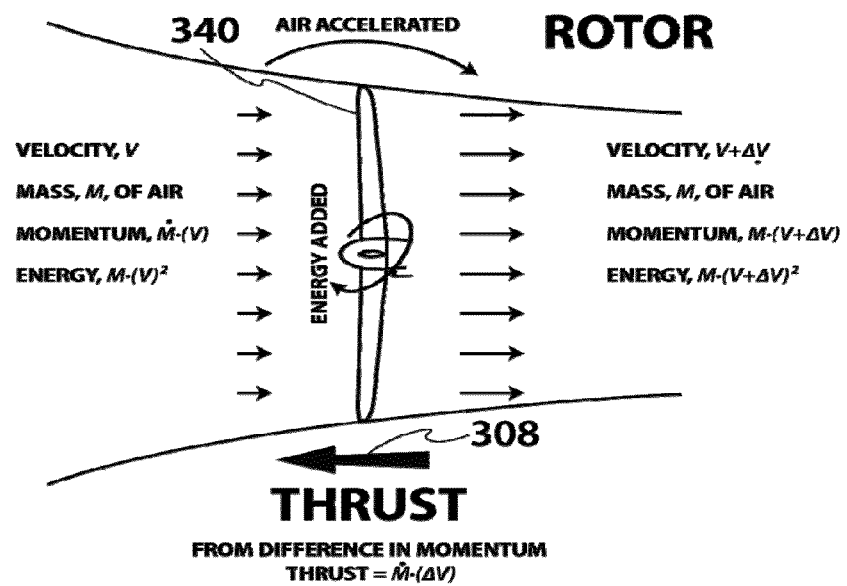
FIG. 3B is a schematic cross-section of a rotor of the aircraft of FIG. 3.

FIG. 3A provides detail of the wing 310 while FIG. 3B provides detail of the rotor 340.

A flying machine must generate lift 304 and thrust 308 forces to fly. Lift is generated by air pressure differences across lifting surfaces, especially wings 310. However, lifting surfaces also generate some drag, including induced drag, due to the direction of the generated aerodynamic force. They, like other parts of an aircraft, also generate drag due to friction and viscous effects. Wings that are long and narrow, said to be of high aspect ratio, are more efficient than short and wide wings in that they produce more lift for less drag (called the lift-to-drag ratio or L/D). However, there are structural limits on how long and narrow a wing can be, especially if the wing structurally supports an engine or rotor. In the case of a helicopter, or a tiltrotor in helicopter mode, lift is generated by the rotor instead of by wings.

It is further advantageous to minimize drag, and thereby the thrust that is generated for flight, by judiciously designing and streamlining the non-wing portions of the aircraft, including the fuselage 330. An efficient aircraft configuration, including for example a sailplane, might have a small fuselage diameter to minimize drag and a long high aspect ratio wing. The overall aerodynamic efficiency of an aircraft can be expressed as an aircraft lift-to-drag ratio.

An aircraft also produces thrust 308 sufficient to counter drag 306. This is often accomplished by the use of a turbine engine attached to a fan in the case of a turbofan or jet engine, a propeller in the case of a turboprop, an inclined rotor in the case of a helicopter, or a prop-rotor 340 in the case of a tilt-rotor. For the most efficient generation of thrust, a large quantity of air is accelerated by the rotor 340 to a speed only slightly higher than the flight speed. This maximizes the propulsive thrust generated while minimizing the energy added. This principle is responsible for the relatively higher efficiency of turboprop engines as compared to turbofan engines at moderate flight speeds. The propulsive efficiency of a propeller, prop-rotor, or rotor is expressed as $\eta$, the cruise propeller efficiency, the product of thrust generated by the propeller and aircraft forward speed, divided by the power input to turn the propeller.

Helicopters generate both lift and thrust forces using rotors. In the case of a hovering helicopter, the thrust and lift forces are equivalent because there is no vehicle forward motion. Thus, for helicopters, the efficiency of generating thrust is particularly important. For efficiency, larger rotors are preferred. However, larger rotors are heavier, and their structural supports tend to constrain rotor diameter. Weight is of particular concern for helicopters, which are often said to be weight critical, because the helicopter rotor alone must generate sufficient thrust to become airborne. In forward flight, a rotor has a low L/D as compared to a fixed wing generating the same lift. Thus, in forward flight, conventional helicopters are inefficient as compared to wing-borne or fixed-wing aircraft. The efficiency of a hovering rotor is quantified by the figure of merit, or FM, which is the ratio of ideal induced power to actual power required to turn the rotor. The best possible FM is 1.0, a typical rotor FM is between 0.60 and 0.80. The disc loading, DL, of rotor is defined as the ratio of thrust generated by a rotor in pounds, T, divided by rotor area in square feet.

To compare the relative efficiency of jet-powered aircraft, propeller-driven aircraft, and helicopters, it is useful to introduce the parameter L/De, the effective lift-to-drag ratio, the lift an aircraft produces divided by its propelling force. For a jet aircraft, L/De is simply equal to L/D. For a propeller-driven aircraft or tilt-rotor, L/De is equal to the product of aircraft configuration efficiency, L/D, and the cruise propeller efficiency, $\eta$. To illustrate the startling gap in efficiency between prior art rotorcraft and fixed-wing transports, consider that a modern efficient transport helicopter typically has an L/De between 4 and 5, while a modern jet transport has an L/De between 14 and 20.

Figure 4:
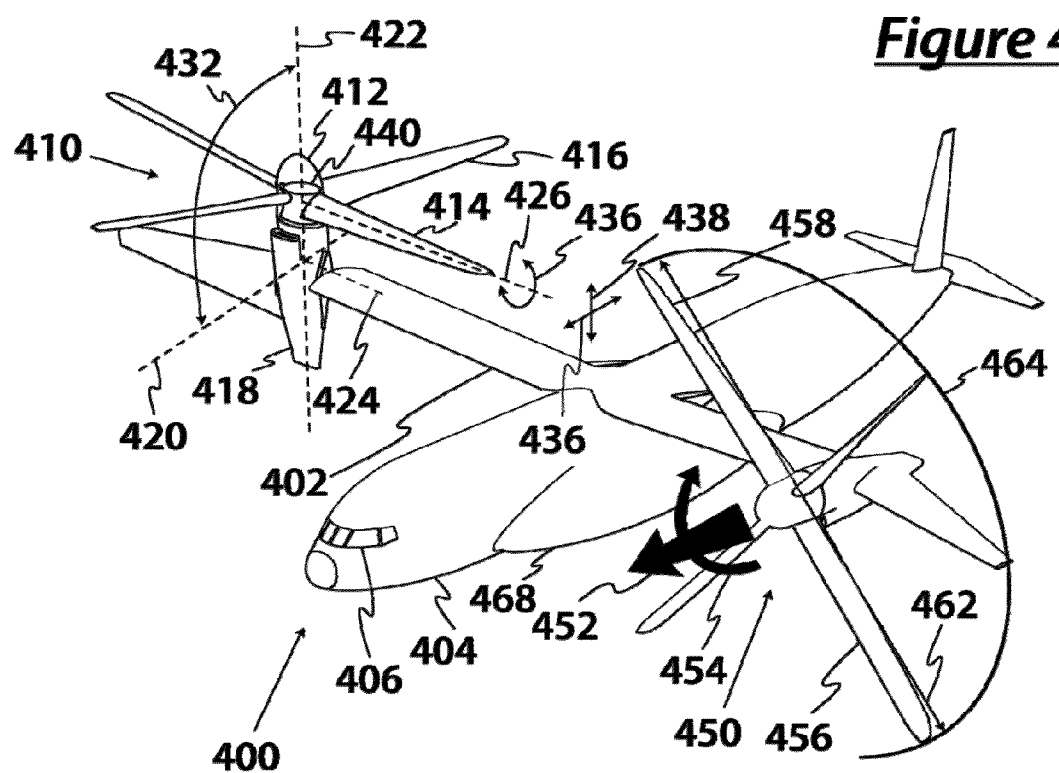
FIG. 4 is a perspective view of another preferred aircraft.

FIG. 4 is a perspective illustration of a preferred tiltrotor aircraft 400 according to the present teachings, comprising a wing 402, cockpit 406, and fuselage 404, a first tilting rotor system 410 shown in helicopter-mode position, and a second tiling rotor system 450 shown in airplane cruise-mode position. These rotor systems have 75-foot diameter rotors. In practice, both the first and second tilting rotor systems 410, 450 are likely to have substantially the same orientation in flight at any given time. A rotor system 450 comprises rotor blades 456, 458 that trace a path 464 that defines a rotor diameter 462. Preferred rotors have rotor diameters of at least 20 feet, 40 feet, 53 feet, 65 feet, 75 feet, 90 feet, or even 120 feet.

In this figure, the wing 402 remains geometrically fixed to the fuselage 404 during flight in both vertical takeoff mode or cruise flight. However, folding, rotating, and tilting wings are also contemplated. In preferred embodiments, the first and second rotors in the first and second rotor systems 410, 450 are of a stiff hingeless variety, including for example that described in U.S. Pat. No. 6,641,365. Such a rotor system 450 transmits considerable forces and moments to the wing 402 and fuselage 404. Hingeless rotor systems for tiltrotors are unlike prior art gimbaled systems in that they can transmit considerable large moments, also referred to as mast moments, to the airframe. In airplane-mode cruise flight, the rotor system 450 generates thrust as indicated by block arrow 452 and moment as indicated by block arrow 454. A rotor system 410 in helicopter mode also generates thrust and moments (not shown).

Rotor system 410 comprises a tilting nacelle 418, which also serves as a tilting mast in the case of this hingeless rotor system, and a hub 440 that is not gimbaled with respect to the nacelle 418. The rotor rotates about the hub axis 422, also known as the "rotational axis of the hub". It can be seen that the rotor comprising rotor blades 414, 416 is disposed on a mast such as the nacelle 418.

The tilt angle, indicated by arrow 432, is the angle between the horizontal airframe axis 420 and the hub axis 422. The entire rotor system 410, including the nacelle 418 and hub 440, is tiltably coupled to the wing 402 by means of a tilt actuator and spindle. The rotor system 410 tilts with respect to the wing 402 about the tilt axis 424. Although the nacelle 418 or mast tilts, it is considered "non-rotating" structure. The term "rotating structure" refers to the hub 440, blades 414, 416, spinner 412 and other components that rotate with the rotor.

First and second blades 414, 416 are preferably coupled to the hub 440 without hinges in the flap direction 438 and lag direction 439. The blades 414, 416 also transmit blade bending moments to the hub in the flap direction 438 and lag direction 439. In turn, the hub 440 transmits thrust and large hub bending moments to non-rotating structure including the nacelle 418, wing 402, and fuselage 404. In preferred embodiments, blade bending moments of 40000, 70000, 100000, 300000 and even 500000 foot-pounds are contemplated. Likewise, hub bending moments, as indicated by arrow 454, of at least 50000, 100000, 200000, 500000, and even 1000000 foot-pounds are contemplated. The structure and design of a preferred hub 440 have elements that allow for the accommodation of such very large blade and hub moments.

The aircraft 400 is also equipped with a sponson 468, which serves as a provision for storing fuel. Preferred aircraft have a fuel capacity sufficient to provide a maximum range of at least 500, 1000, 2000, or even 5000 miles carrying its maximum payload. Some preferred aircraft have provisions (not shown) for storing fuel in fuel tanks in the wing.

Layout and Dimensions of an Especially Preferred Aircraft

Among the contemplated aircraft is a most preferred embodiment (dubbed the TR53) of a commercial passenger transport that is expected to be able to compete cost-effectively with jet transports and with high speed trains. The TR53 is named as such because it has two 53 foot diameter side-by-side rotors. Those skilled in the art will appreciate that the inventive principles discussed herein are also applicable to a wide range of other rotorcraft, including those having larger or smaller rotors, and other rotor configurations.

Figure 5:
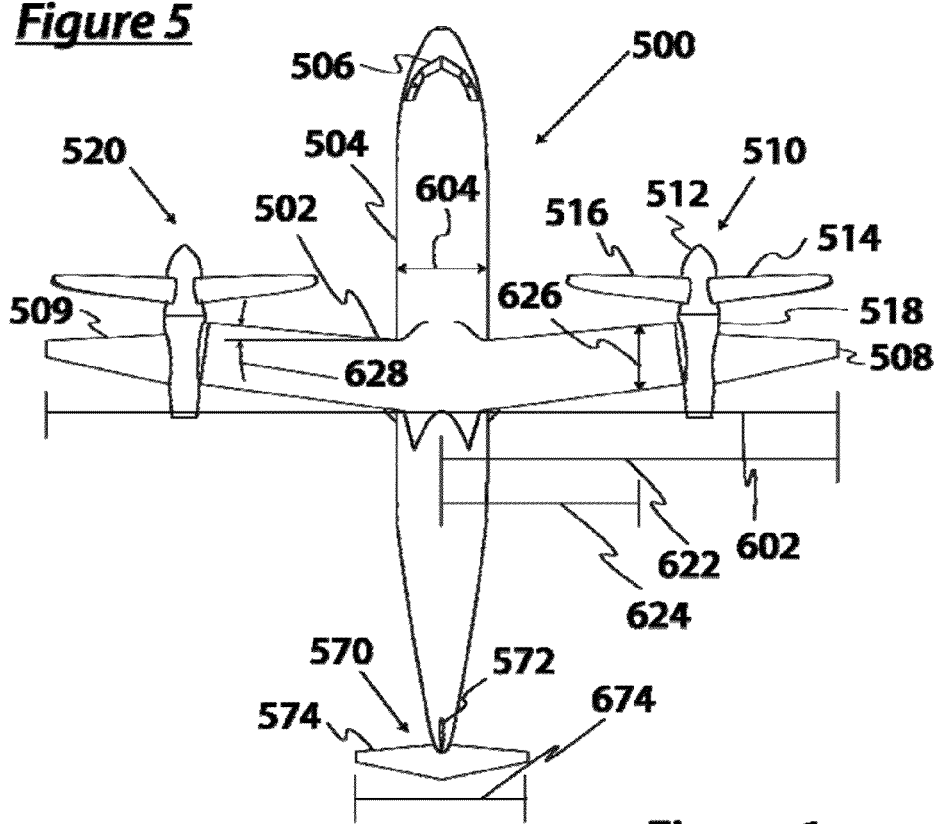
FIGS. 5, 6 and 7 are top, side and front views, to scale, of an especially preferred aircraft.
Figure 6:
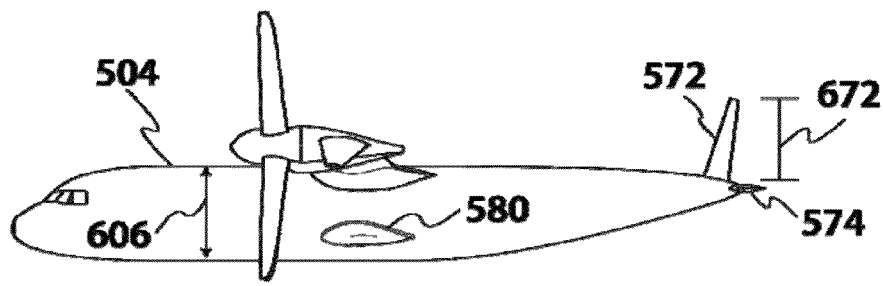
Figure 7:
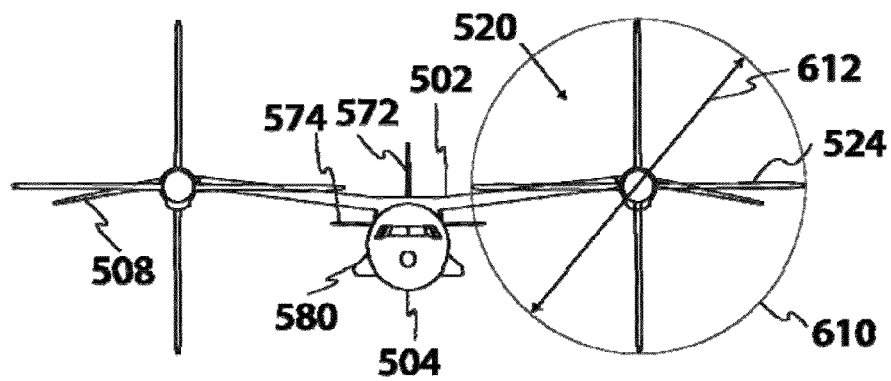

FIG. 5 shows a top-view drawing of a TR53 aircraft 500, while FIG. 6 is a side view and FIG. 7 is a front view of the same aircraft. The aircraft comprises a fuselage 504 sized and dimensioned to carry a payload. Preferred payloads include passengers, package freight, and other cargo. The TR53 is capable of carrying payloads of up to between 26000 pounds and 42000 pounds depending on the configuration. Naturally, the aircraft can carry payloads less than its maximum payload, and thus the fuselage is sized to carry at least 20000 pounds of payload. Contemplated fuselages for other aircraft designed according to the teachings herein can be sized to carry at least 5000, 10000, 50000, or 82000 pounds.

The aircraft 500 is also advantageously equipped with first and second rotors 510, 520, which are sized and positioned to be able to either lift the aircraft vertically or provide thrust in cruise flight. A first rotor 510 is carried by a tilting nacelle 518, thereby making the first rotor 510 a tilting rotor. The tilting nacelle 518, in turn, is carried by an inboard wing section 502. The wing is sized and dimensioned to support the aircraft in cruise flight, and is disposed to carry the first and second tilting rotors 510, 520. In the TR53, the wing comprises an inboard wing section 502, and first and second outboard wing sections 508, 509. The total wingspan 602 is the length from one wingtip to the other. The wing halfspan 622 is the distance from the fuselage centerline to a wingtip. The inboard wing section 502 has a station and a wing airfoil at mid span 624, which is half-way between the fuselage centerline and a wing tip. The chord 626 of the inboard wing section 502 is the width of a section. At mid span 624, the wing section has a chord and thickness. The wing is advantageously configured to have a thickness-to-chord ratio of at between 19% and 22% or even between 18% and 21% in order to provide for high-speed flight.

The aircraft 500, like any aircraft, has an empty weight when neither fuel nor payload are present on an otherwise operational aircraft. Similarly, the aircraft 500 has a maximum takeoff weight, beyond which the aircraft no longer has the capability to become airborne under its own power. The maximum takeoff weight is usually associated with a maximum combination of fuel and payload. For a vertical takeoff-aircraft, an aircraft has a maximum hover weight, which is the maximum weight at which an aircraft can hover under its own power and maintain structural integrity. The aircraft 500 can also perform a short-takeoff, with a higher takeoff weight. While these weights can vary somewhat with atmospheric conditions, sea level altitude, standard atmosphere conditions are assumed herein unless otherwise specified.

The wing, comprising an inboard wing section 502 along with first and second outboard sections 508, 509, has a planform area, which is the projected area of the wing when viewed from the top, as in FIG. 5. In the case of tilting wings, the planform area is the greatest projected area as the wing tilts. The wing also has a wetted area, which is the total exterior surface area of the wing, including the underside and top side of the wing. An aircraft having a wing has a maximum wing loading that is defined as the maximum takeoff weight divided by the wing planform area. Preferred embodiments have maximum wing loadings between 60 and 140 pounds per square foot.

A wing also has an aspect ratio defined as the square of the total wingspan 602 divided by the wing planform area. Preferred aircraft have wings that are proportioned to have an aspect ratio between 10 and 22, 12 and 20, or 14 and 18. Achieving these high aspect ratios is difficult in tiltrotors because the wing must support tilting rotors 510, 520. Further, a wing has a leading edge sweep angle 628, which is defined to be the average angle between a line normal to the fuselage centerline and the leading edge of the inboard wing section 502 that goes between the fuselage 504 and a rotor 520. Preferred aircraft have leading edge sweep angles of less than 20°, 15°, 10°, or even 5°.

As shown in FIG. 5 and FIG. 6, the TR53 also has an empennage 570, comprising a vertical tail 572 and a horizontal tail 574. The horizontal tail 574 has a span 674 and the vertical tail 572 has a height 672. The empennage 570 has a wetted area, defined as the total exterior surface area of all tail surfaces, including the vertical tail 572 and horizontal tail 574. The TR53 empennage 570 has a wetted area of 372 square feet, while the wing has a wetted area of 2092 square feet and a planform area of 1000 square feet. Preferred aircraft have an empennage, where the wetted area of the empennage is between 14 and 40 percent, or even between 10 and 20 percent of the wetted area of the wing.

The TR53 aircraft 500 has a fuselage 504, the payload-carrying portion of which has a width 604 and a height 606 as shown in FIGS. 5 and 6. As shown in FIG. 7, the fuselage 504 has a frontal area, defined as the projected area of the fuselage when viewed from the front. The TR53 fuselage has a frontal area of 133 square feet. Preferred aircraft have a frontal area that 10 and 16 percent, or between 11 and 15 percent, of the planform area of the wing. The fuselage also has a landing gear sponson 580 for storing retractable landing gear.

As shown in FIG. 7, a rotor 520 has a blade 524 that sweeps out a circle 610 during rotation that defines a rotor diameter 612. The rotor area is defined as the area of the circle 610 swept out by the tips of rotor blades. In the case of rotors of variable diameter, the rotor area is the maximum rotor area. The TR53 has two rotors of 2200 square feet area each. An aircraft that is capable of hovering has a maximum disc loading defined as the maximum hover weight divided by the sum of all rotor area. The TR53 has a maximum disc loading of 27.3 square feet. Preferred aircraft have a plurality of rotors rotor sized and dimensioned to hover the aircraft with a rotor disc loading of at most 20, 30, 40, 50, or even 60 pounds per square foot at a maximum hover weight.

FIG. 8 contains a table with dimensions and physical characteristics of a preferred TR53.

Aircraft Structure, Mechanical Systems, and Weights

At a constant disc loading, the thrust produced by a rotorcraft is relatively proportional to the rotor diameter squared while the rotor weight is proportional to the rotor diameter cubed. This is known as the square-cube law in the industry and results in both an undesired trend of increased disc loading in larger rotorcraft, and extreme difficulty in designing very large rotorcraft. Large rotor designs increase disc loading in order to reduce the diameter appropriate for a given vehicle weight. Furthermore, prior art large rotor designs have articulated hub systems to minimize blade flap and hub bending moments. However, the complexity of articulated rotor systems as found on most large helicopters contributes significantly to their high cost, relatively short lifetime, and high failure rate.

Simpler rotor designs exist, known as hingeless rotors, which have advantages in cost, lifetime, and failure rate. Because of the high bending loads associated with hingeless rotors, and the effects of the square-cube law, hingeless rotors have been limited to small rotors in order to avoid the increase in rotor weight resulting from these loads. U.S. patent application Ser. No. 12/427,961 teaches hubs for large hingeless rotors capable of withstanding high bending moments.

The TR53 is envisioned as a high composite content aircraft taking advantage of several aspects of composite materials and manufacturing technology not currently integrated.

The TR53 is currently contemplated to operate at a relatively high rotor disc loading (as compared to helicopters), of 23 pounds per square foot, with potential capacity of 30 pounds per square foot, or more. Such a high disc loading combined with the need for lightweight structure produces a demand for lightweight and stiff rotor blades. The rotor blades of preferred embodiments are of a substantially all-composite structure, using high modulus graphite in structural areas important to the required blade stiffness. As described in Self-Tooling Composite Structure, U.S. patent application Ser. No. 12/200,534, the blade structural spar is advantageously of a multi-celled design that increases buckling strength, and creates a relatively strong interface between the spar cap and web by interweaving plies.

The 23-30 pounds per square foot of disc loading assume a conservative structural safety factor. Using less conservative safety factors, the subject matter herein is enabling for disc loading of up to 40, 50, 60 or even 70 pounds per square foot. Independently, the thickness of contemplated blade structural laminates or hub wall thicknesses could be increased to allow for a rotor disc loading of up to 40, 50, 60 or even 70 pounds per square foot.

U.S. Pat. No. 6,641,365, Optimum Speed Tilt-Rotors, and U.S. Pat. No. 6,007,298, Optimum Speed Rotor provide major steps forward in rotorcraft utility, maneuverability and performance. Among other things, these patents teach low rotor blade weights, and appropriate structural dynamic solutions to avoid aeroelastic instability. Significantly, however, OSR or OSTR rotors develop high blade bending moments and mast moments, which increase with rotor disc loading. In OSR and OSTR rotors, which necessarily are relatively light and stiff, blade flap moment and rotor mast moments dominate other rotor loads. The preferred embodiments of '298 and '365, as well as the implementation of the OSR patent in the Boeing Hummingbird A160, were for low rotor disc loadings, typically less than 6 pounds per square foot.

Composite Blade Root Structure, U.S. patent application Ser. No. 12/397,833, Self-Tooling Composite Structure, U.S. patent application Ser. No. 12/200,534, and Wing And Blade Structure Using Pultruded Composites, U.S. patent application Ser. No. 12/397,141 provide composite structures and manufacturing methods to achieve high-stiffness, lightweight affordable blades which are capable of sustaining the high loads typical of a high disc loading OSTR rotor.

High Compressive Strength Fiber-Placed Composites, U.S. Patent Application No. 61/099,865, Structural Enclosure For An Aircraft Propulsion System, U.S. patent application Ser. No. 12/254,971, Composite Bulkhead And Skin Construction, U.S. patent application Ser. No. 12/246,904, Automated Prototyping Of A Composite Airframe, U.S. patent application Ser. No. 12/396,927, High Quality Out-Of-Autoclave Composites, U.S. Patent Application No. 61/047,877 and Rotorcraft with Integrated Spar and Tilt Trunnion, U.S. Patent Application No. 61/047,853 provide composite structural design, materials and manufacturing processes to achieve substantial reduction in weight and reduction in manufacturing cost of composite airframe.

High Performance Outboard Section for Rotor Blades, U.S. patent application Ser. No. 11/505,157, Shaped Blade for Reduced Loads and Vibration, U.S. patent application Ser. No. 11/505,040 and Rotorcraft With Opposing Roll Mast Moment U.S. patent application Ser. No. 11/505,066 provide systems and methods related to the rotor blades and/or rotor operations, mainly in order to improve performance and reduce loads and vibrations.

Blade section structural analysis on the TR53 has been performed using Cosmos™/M show no buckling, and a relatively even stress distribution in compression along the upper cap and tension along the bottom cap under upward bending. Even stress distributions are conducive to long blade life and efficient structural design.

In preferred embodiments, a thin, aerodynamically efficient blade shape transitions to a circular attachment at the hub interface as described in Composite Blade Root Structure, U.S. patent application Ser. No. 12/397,833. Additionally, the rotor blade can advantageously use pultruded high modulus composite materials in the lamination, as described in Wing and Blade Structure Using Pultruded Composites, U.S. patent application Ser. No. 12/397,141, creating a structure with a high compression strength and high overall stiffness. Laminations can constitute approximately 10 unidirectional plies of 0.007" thickness, interlaid with one or two biased plies of the same thickness. Two or three unidirectional pultrusions of 0.02"-0.035" thickness and 1"-2" width can be laminated in place of the individual unidirectional plies to create a pultrusion based lamination. This is especially preferred in the upper cap of the blade spar, as it will benefit most from the increased compression strength that the pultrusions provide. Analysis, conducted with Cosmos™/M software, shows that pultrusions can be made thin enough such that their terminations within a laminate do not induce stresses that would damage the laminate. In preferred embodiments, several pultruded plies are interlaid with biased prepreg layers. In some cases, pultrusions can also be tapered at their terminations to reduce the stress concentrations that are developed.

In preferred embodiments, the hub is capable of providing lightweight efficient blade feathering support under the large bending moments generated by rotor blades. U.S. Patent Application No. 61/047,167 describes a preferred integrated lubrication and cooling system disposed within a tailored thickness bearing support structure. The use of this design creates a lightweight and efficient transfer of the large blade moment loads to the monocoque nacelle structure. The '167 patent application further teaches stiffness, reliability, fatigue life and low maintenance required for low weight and affordable cost.

The thickness distribution and shape of the hub structure of the TR53 is preferably tailored to limit the deflection of the feather bearing. Deflection of points around the feather bearing perimeter have been analyzed versus distance from the center of the bearing, showing the relatively low deflection of the bearing out of the plane normal to the blade feather axis as deflected under load. Low deflection of the bearing out of the plane contributes to long bearing life. Analysis of the TR53 hub structure done with CATIA™ and NASTRAN™ software shows maximum von Mises stresses within acceptable material limits for the envisioned two-part forged titanium or steel design.

The preferred hub system of the TR53 integrates a closed lubrication and cooling system that supplies both the gearbox in the non-rotating airframe and the feather bearings and actuators in the rotating hub frame. The TR53 is envisioned to use substantially all-electric actuation to provide additional weight savings. Furthermore, especially preferred embodiments include individual electric actuation for each rotor blade, thereby providing the aircraft with individual blade control, and the resultant weight, safety, and reliability benefits.

U.S. Patent Application No. 60/981,559 teaches a monocoque nacelle structure. Preferred nacelles have a large diameter and are constructed of high strength composite materials to enable the transfer of relatively large loads from a rotor to a wing and fuselage. In preferred designs, a limited portion of the nacelle structure serves as a primary monocoque load path from a rotor hub to a tilting nacelle support structure or trunnion. Other structural portions of the nacelle preferably comprise lightweight sandwich construction composite panels, and can be shaped to improve efficiency in high-speed flight.

Figure 9:
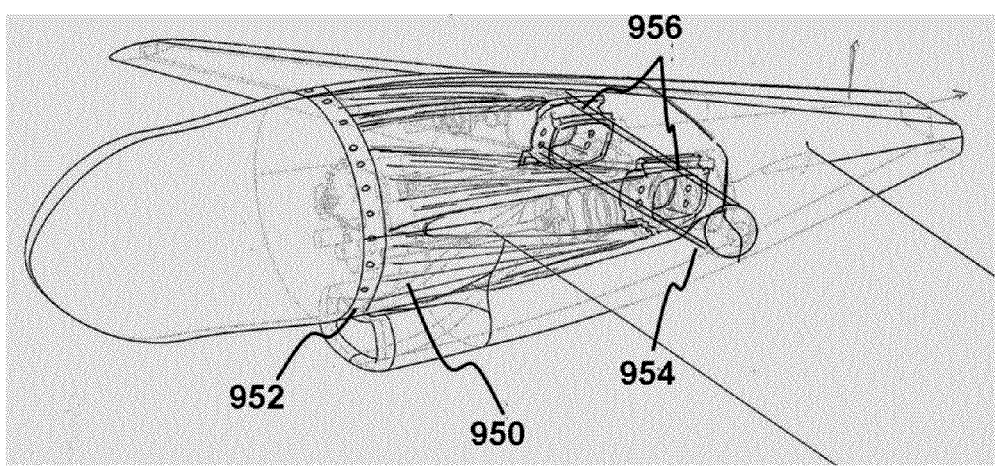
FIG. 9 is a perspective view of a preferred nacelle structure.

One preferred nacelle primary structure is illustrated in FIG. 9. Unidirectional fibers 950 are evenly distributed around the circumference of the nacelle to hub interface 952 converge at several discrete points near the attachment of the nacelle to the spinnion structure 954. The nacelle is fastened to the spinnion using titanium fittings 956. Details of this mechanical interface between the nacelle and hub bearing have been analyzed. A composite-to-metal transition that allows the hub bearing to be fastened to the nacelle is contemplated. Thus, it is contemplated that loads generated by a TR53 rotor can be advantageously transferred from the rotor to the nacelle and wing using a spar structure joining the nacelle to the inboard wing.

Unlike most tilt rotor aircraft, the TR53 uses a spinnion. U.S. Patent Application No. 61/047,853, teaches such a structure, which combines the function of a high moment capacity conversion spindle and an outboard wing spar, thereby reducing weight for a higher capacity structure and lowering part count.

The TR53 is designed to be capable of transitioning the position of the nacelle under heavy moment loads not seen by prior art tilt rotor aircraft. Additionally, the hingeless nature of the TR53 rotor allows for an advantageous method of creating a control yaw moment in the vehicle without vectoring the rotor thrust. Tilt Actuation for a Rotorcraft, U.S. Patent Application No. 61/044,429, enables this functionality, as well as providing a lightweight geared down mechanism for tilting the rotor. Also envisioned in the '429 application are methods of operating the tilt mechanism with moment loads generated by the rotor, both to increase fault tolerance and increase performance.

Either of two gearbox configurations, demonstrated in Torque Balancing Gearbox, U.S. patent application Ser. No. 12/399,594 or Lightweight Reduction Gearbox, U.S. Pat. No. 7,500,935, is envisioned for use in the TR53. Both enable high torque capacity operation at weights significantly lighter than those achieved by conventional designs.

The TR53 is contemplated to use several of the aforementioned patent pending systems and methods to produce a lighter, safer and more efficient aircraft. In addition, the airframe is designed to aggressively reduce weight and cost. Aircraft manufacturers have begun to embrace composite materials, for example, the Beechcraft™ Starship, Raytheon™ Premier™, Boeing™ 787 each make use of carbon composite materials in primary structure. However, these aircraft gain only a subset of the advantages achievable through use of composite materials and manufacturing technology. In the prior art construction of a bulkhead to skin assembly of a Boeing™ 787, each individual composite bulkhead is fastened to the skin through an intermediary piece, greatly increasing part count. The total titanium rivet count in one barrel section of the Boeing™ 787 fuselage is over 10,000 pieces. Although the Boeing™ 787 is almost 50% composite materials, titanium represents 15% of the overall weight of the aircraft. In addition to this, the fuselage is assembled from more than 6 barrel sections.

Figure 10:
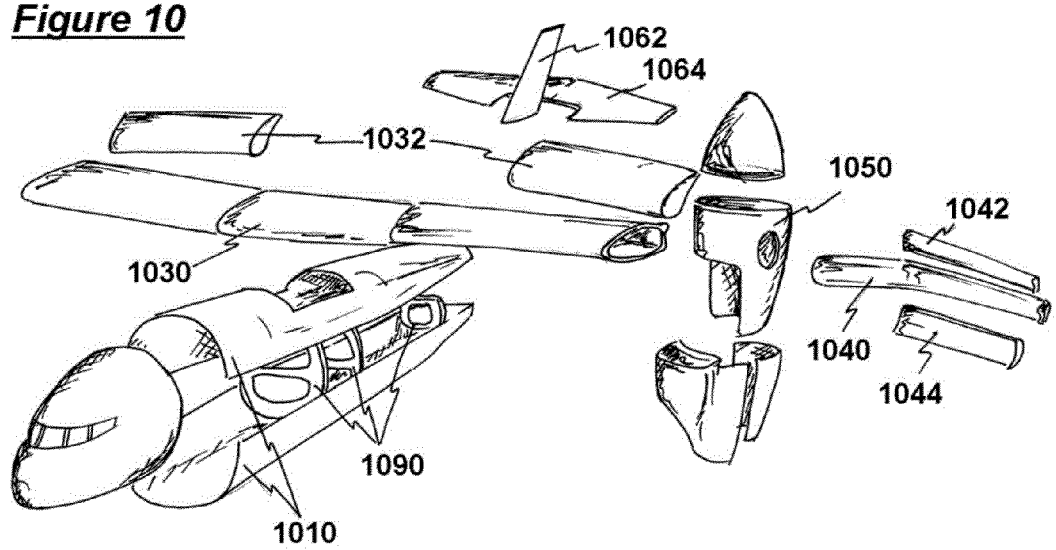
FIG. 10 is exploded view of a preferred aircraft structure.

By contrast, it is contemplated that the TR53 fuselage could be assembled in 2-3 segments as shown in FIG. 10. Each segment preferably has a length that is 20%, 30%, or even 40% of the length of the entire aircraft. Each of the fuselage segments 1010 could be built up in a composite tool manufactured from low-temperature tooling materials, including for example the process described in U.S. patent application Ser. No. 12/396,927. These fuselage segments 1010 would be laminated with an automated fiber placement, using out-of-autoclave resin systems. By using out-of-autoclave low-temp-high-temp two-stage resins, the labor and capital expenses of the autoclave are eliminated. These high temperature capable tools have the locating features necessary to double as assembly tools during the bonding of composite bulkheads into the fuselage sections further reducing the step of transferring the part from one tool to another, and reducing the overall tool count.

As described in Composite Bulkhead and Skin Construction, U.S. patent application Ser. No. 12/246,904, the bulkhead frames can use pultruded carbon materials in the inner caps, and the outer cap material can be laminated into the outer skin during the automated fiber placement process. The skin of the fuselage can be a highly orthotropic laminate supported by co-cured laminated hat stringers and bulkheads with cutouts for stringers, or it can be a hybrid honeycomb-cored sandwich skin and bulkhead supported structure. Ideally, the tension in the fibers can be controlled during fiber placement to decrease the waviness of the laminate, and thus increase the compressive strength of the laminate where needed. Aspects of preferred systems and methods are disclosed in U.S. Patent Application No. 60/979,630.

Several innovative design features combine to substantially reduce the weight of the contemplated TR53 airframe relative to prior art rotorcraft. In FIG. 10, the wing box 1030 is made from a single piece that fits between the left nacelle 1050 and right nacelle (not shown). The attachment of the wing to the fuselage is through a pinned attachment that allows the wing to bend in flap. Thus, bending loads in the wing are transferred to the fuselage primarily as shear, not bending. Replaceable components such as wing flaperons 1032, 1044 and slats 1042 are made of lightweight composite sandwich construction. Other components include a horizontal tail 1064 and vertical tail 1062, and fuselage bulkheads 1090.

Wing and Blade Structure Using Pultruded Composites, U.S. patent application Ser. No. 12/397,141, also teaches the concept of using pultrusion based laminates in the wing box of an aircraft. Currently contemplated versions of the TR53 integrate this concept into the inboard wing box, rotor blade, and spinnion. Modal and structural analysis performed on this wing structure with Cosmos™/M and spreadsheet tools have verified the design.

FIG. 11 is a table containing preferred weights including preferred empty weights and preferred maximum hover weights (design gross weights) as calculated for two versions of the TR53 as verified using the analyses described above. This table contains details of the calculations showing the empty weight fraction of a civil passenger version of the TR53 to be 0.55 and the empty weight fraction of a civil cargo version of the TR53 to be 0.34. Preferred aircraft have an empty weight is at most 58%, 60%, or 65% of the aircraft maximum hover weight.

Aerodynamic Efficiency

The TR53 is the first VTOL transport aircraft contemplated to realistically compete with traditional fixed-wing jet and propeller transports. To achieve commercial viability in a tough market dominated by jet transports, the TR53 combines a helicopter-like disc loading (a higher disc loading requires higher installed power for hover takeoff and landing) with high hover figure-of-merit and aerodynamic performance needed for efficient cruise.

Aerodynamic Efficiency—Blade Root and Spinner for High Speed Cruise

The TR53 is designed to cruise efficiently at Mach 0.65. This is about 35% faster that the prior art Bell™ V-22 tiltrotor and 30% faster than the prior art Bell™ BA609 tilt-rotor. This cruise speed is important both for aircraft passenger transport productivity goals in terms of passenger miles per day and for the important goal of reduced door-to-door travel time. To achieve these goals, the present embodiment contemplates shaping the inboard blade planform to increase chord while reducing thickness ratio.

Figure 12:
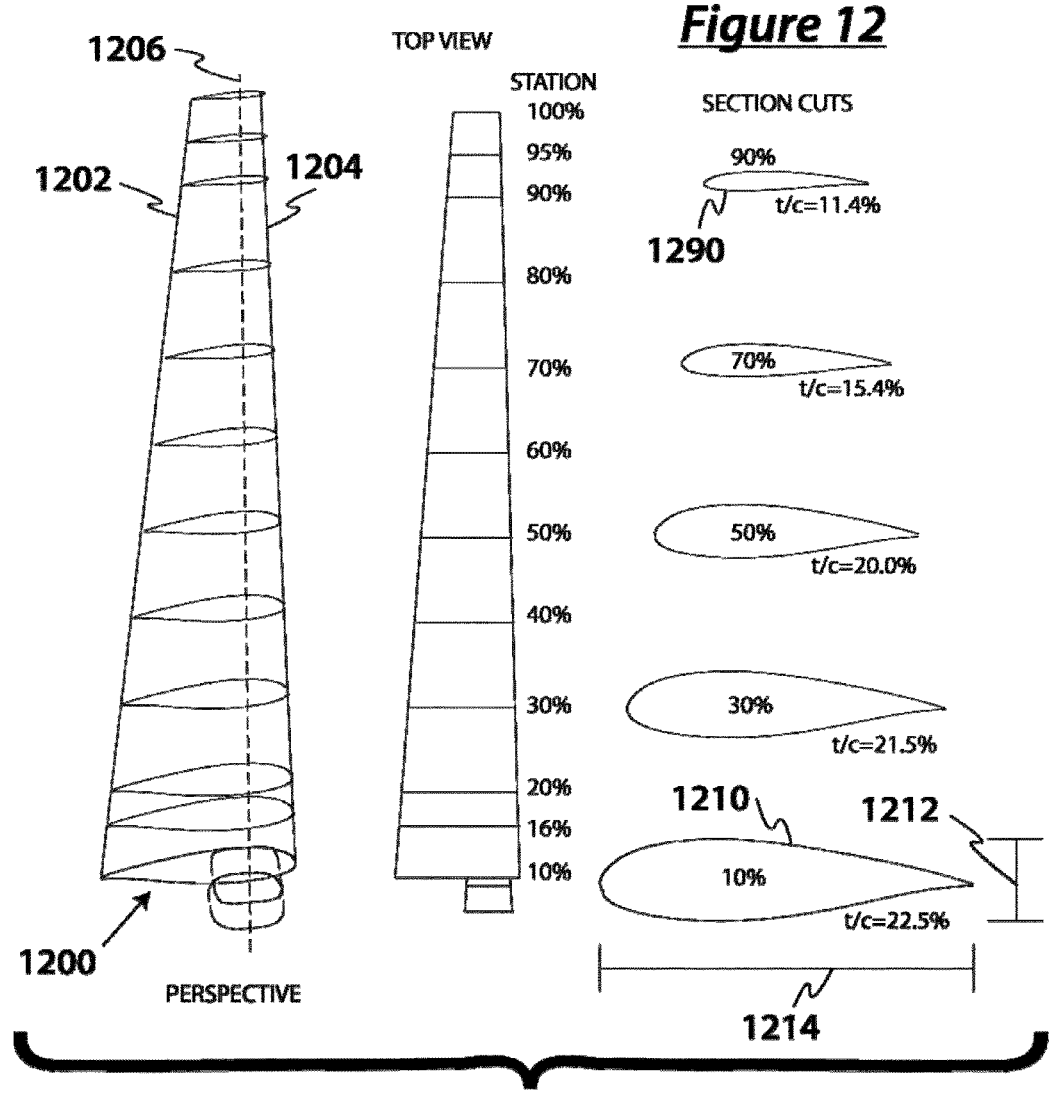
FIG. 12 is a schematic view of a preferred rotor blade showing airfoil section thicknesses at various stations on the blade.

In preferred embodiments, this is combined with judicious design and improvement of blade root airfoils, which are depicted in FIG. 12. A blade 1200 comprises a leading edge 1204 and trailing edge 1202 arranged around a pitch axis 1206. A preferred embodiment root airfoil section 1210 has a thickness ratio, airfoil thickness 1212 divided by airfoil chord 1214, t/c, of only 22.5%. The thickness ratios diminish with increasing blade span as shown in FIG. 12, such that an airfoil 1290 at 90% span has a thickness ratio of 11.4%. Achieving a thickness ratio of 22.5% at the blade root while ensuring that the desired structural dynamic characteristics (and the desired low blade weight per blade flap moment capability) are achieved, such that the first blade flap and lag frequencies are greater than 2/rev at the maximum hover rpm, requires special blade composite construction methods, described previously. The term "2/rev" refers to a frequency associated with a speed twice that of the rotor rotational revolution, and would mark an event happening at twice per rotor revolution.

Lift-to-drag polars for preferred embodiment rotor airfoils show reduced drag even at section Mach numbers of 0.65 to 0.70. Maintaining low drag levels at high Mach number is traditionally difficult. For example, it is difficult to maintain a sectional drag coefficient of 0.045 at Mach 0.70 using prior art airfoil sections having a thickness ratio of 26.5% or more. For the TR53, a lift-to-drag polar for an especially preferred embodiment root section airfoil having a thickness ratio of 22.5% was calculated that shows that a drag coefficient of only 0.025 could be obtained a preferred root airfoil section (see FIG. 12), a major improvement over the prior art. The lift-to-drag polars for thinner sections further outboard on the blade have thickness ratios of 20% and 11.4% and 10% at the tip. These preferred embodiment airfoil designs provide very low drag and a broad operating envelope. These lift-to-drag polars were obtained using computational fluid dynamics software, MSES, a coupled viscous and inviscid Euler approach well known in the industry, and ANSYS™ Fluent.

Figure 13:
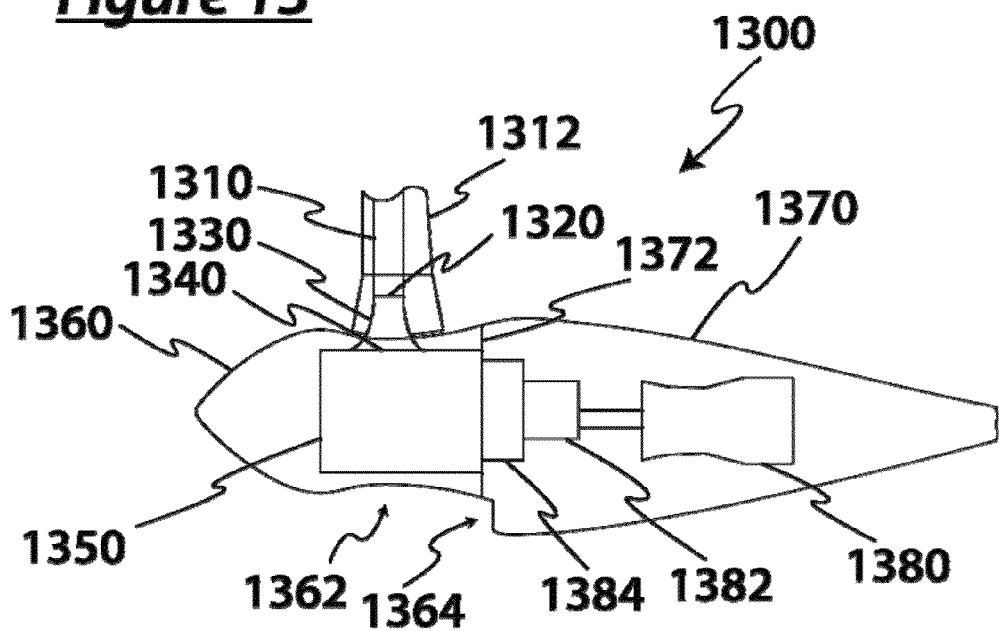
FIG. 13 is a schematic of a preferred nacelle.

The TR53 also has a rotor spinner fairing. A spinner creates blockage for the inboard blade sections, further raising the local flow Mach number. Computational fluid dynamics simulations have analyzed the airflow around blade roots, spinner, and wing at cruise speeds including Mach 0.65. As shown in FIG. 13, a dramatically area-ruled spinner is contemplated that can lower the Mach numbers by 0.01-0.03 at rotor blade sections inboard of 25% of span, depending on the degree of area ruling and spanwise position of the section, substantially increasing the envelope for efficient cruise. In the TR53, shaping the tiltrotor spinner is calculated to increase the efficient cruise Mach number of the rotor by about 0.02.

FIG. 13 is a side-view illustration of a preferred blade-nacelle interface 1300. A blade comprises a spar 1310, aerodynamic fairing 1312, section of the spar near the shank 1320, and cuff 1330 acting as a transition to a blade shank 1340. The blade shank 1340 is coupled to a rotating hub 1350, which in turn is coupled to a tilting nacelle 1370 through a rotating interface 1372. The hub 1350 and blade shank 1340 are at least partly disposed in a spinner 1360, which acts as an aerodynamic fairing. The spinner is advantageously configured with a concave region 1362, reducing the spinner diameter by 3%, 5%, or even 10% from a maximum spinner diameter. This concave region 1362 effectively slows the airflow as it passes over the thick blade root region, allowing the aircraft to fly faster. The blade cuff 1330 and aerodynamic fairing 1312 are also configured to provide smooth airflow into an engine inlet 1364.

Application of the teachings found in this specification allow for relatively smooth airflow at Mach 0.55, 0.60, or even 0.65 around the nacelle 1370 and the absence of a shock wave at the engine inlet 1360 to the engine even given the relatively thick blade aerodynamic fairing 1312 and associated airfoils. As used herein, a "relatively thick" airfoil has a thickness-to-chord ratio of at least 18%, 20%, 23%, 27%, or even 30%.

In preferred embodiments, the hub 1350 is coupled to a reduction gearbox 1384, two-speed shifting gearbox 1382, and turboshaft turbine engine 1380. Along with the rotor and airframe design, the configuration of the reduction gearbox 1384, shifting gearbox 1382, and turboshaft engine 1380 allow the aircraft to sustain cruise flight with the rotor operating at a rotational speed no greater than 40%, 50%, 60%, 75%, or 80% of its operational maximum rotational speed. The turboshaft engine 1380 is advantageously sized and dimensioned both to power the rotors to lift the aircraft vertically, and to provide sufficient power to overcome an aerodynamic drag of the aircraft in sustained high-speed forward flight at Mach numbers of 0.5, 0.55, 0.6, or even 0.65. As used herein, the term "sustained cruise flight" means a steady, level flight condition (excludes maneuvering flight) substantially in equilibrium for a continuous period of at least 10 minutes. For example, an aircraft on a flight from San Francisco to Los Angeles might take off vertically, convert to airplane mode, climb to a designated altitude of 31000 feet, engage in sustained cruise flight at that altitude for 45 minutes, then descend and vertically land.

Aerodynamic design is also important for proper operation of a turbine engine. In preferred embodiments, for example, the engine air intake, is placed behind the plane of the rotor. Because of this, the inlet ingests the rotor wake flow. Still further, the blade root design, spinner shape, and inlet design of preferred embodiments are all iterated in a coupled environment that tries to ensure that the flow entering the engine is in such a state that engine limits for safe and efficient operation are satisfied. Computational fluid dynamics simulation results show the trailed blade wake in front of the engine inlet can be accommodated without undue loss of efficiency. The inlet of the TR53 is designed to provide high efficiency in hover while providing a large mass flow of air to the engine. The inlet of the TR53 is also designed to provide high efficiency in cruise while providing a reduced mass flow of air to the engine and low spillage drag when the aircraft is simulated to be cruising at a speed of Mach 0.65.

The aforementioned design process and aerodynamic design of the rotor and inlet for the TR53 also assists in maintaining sufficient engine operational margins during flight.

Aerodynamic Efficiency—Efficient Transonic Wing

A large high-aspect ratio wing can assist in achieving cruise efficiency, and in closing the productivity gaps with traditional fixed-wing transports. Currently contemplated versions of the TR53 include a wing capable of supporting tilting structure, that is sufficiently stiff to remain free of aeroelastic flutter to Mach 0.65 and beyond, and that also is sufficiently thin to be capable of efficient flight at Mach 0.65. These are usually conflicting requirements, but the present inventive subject matter provides a resolution of the conflict by use of a judiciously-designed composite wing structure and special airfoil designs. It should be noted that lightweight rigid rotors, such as those taught in OSTR, U.S. Pat. No. 6,641,365 can delay the onset of whirl flutter to a higher flight speed than a conventional rotor system. A preferred wing is shown in FIG. 5 as inboard wing section 502 along with outboard wing sections 508, 509.

Prior art tiltrotor wing designs, the Bell™ V-22 and Bell™ BA609, were thick (23% thickness ratio) and of low aspect ratio, 5.5, to maintain a lower weight while remaining aerostructurally stable to Mach 0.45. As a result, these prior art designs were unable to achieve high cruise efficiency.

By contrast, highly efficient transonic wings for a transport aircraft, such as that disclosed herein, have high aspect ratio and low thickness ratio, with an appropriate degree of wing sweep. A currently most preferred wing for the TR53 has a very high wing aspect ratio of 16.3 and a low thickness ratio of 20.4%, and an inboard wing sweep of 5°. This provides unprecedented cruise efficiency for a tilt-rotor. Also, the inboard wing for the TR53 is currently contemplated to have a taper ratio of 0.86 to increase bending stiffness within acceptable weight. Teachings on improving wing efficiency in tilt-rotor aircraft can be found in U.S. patent application Ser. Nos. 11/505,067 and 11/505,025.

Figure 14A:
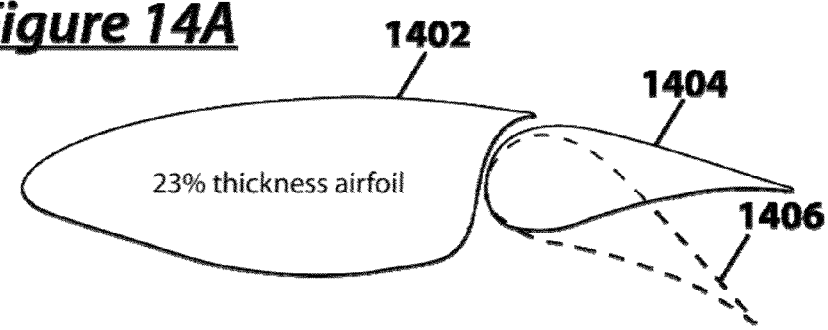
FIGS. 14A and 14B are vertical cross sections of alternative wing airfoils.
Figure 14B:
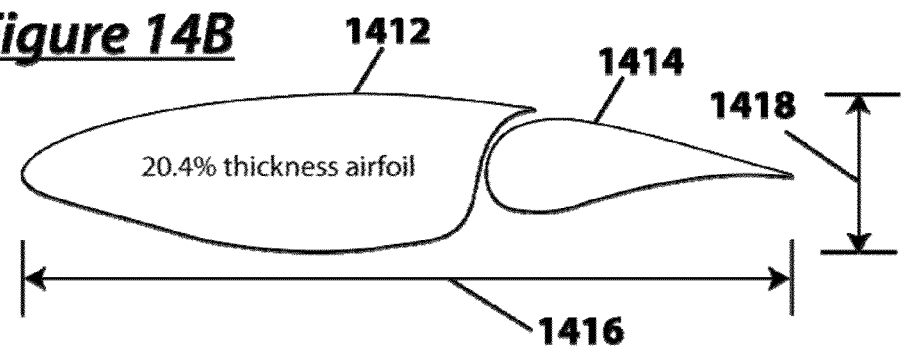

The TR53 is also contemplated to include airfoils that increase the maximum lift limit at a high cruise speed. This is known as the $M^2C_L$ limit in the industry, and results from the product of the square of the cruise Mach and the lift coefficient. These airfoils provide most of the lift on the leading edge under camber and trailing edge under camber, while providing a thick mid-section for the required wing stiffness in bending and torsion. Special care is also given to increasing airfoil section thickness at the chordwise location of the nacelle tilt spinnion. FIG. 14A depicts a preferred wing airfoil 1402 that is 23% thick with an undeflected cruise flap 1404 and partially deflected flap 1406. FIG. 14B depicts an especially preferred 20.4% thick inboard wing airfoil 1412 and undeflected flap 1414 section. The airfoil has a chord 1416 and thickness 1418. The thickness ratio, expressed as a percentage, is computed by dividing the maximum thickness 1418 by the chord 1416 with any flaps 1414 or slats in the undeflected configuration. Computational fluid dynamics results on this section at Mach 0.65 show a large laminar drag bucket, with a usable operating regime having a sectional drag coefficient of 0.006 at Mach 0.65, a significant improvement over the prior art. The outboard wing section was equipped with a novel reflexed flap deployed to minimize separation and drag. Computational fluid dynamics results generated using ANSYS™ Fluent at a cruise Mach 0.65 show good overall wing pressure distribution and efficiency of a preferred embodiment.

Figure 15:
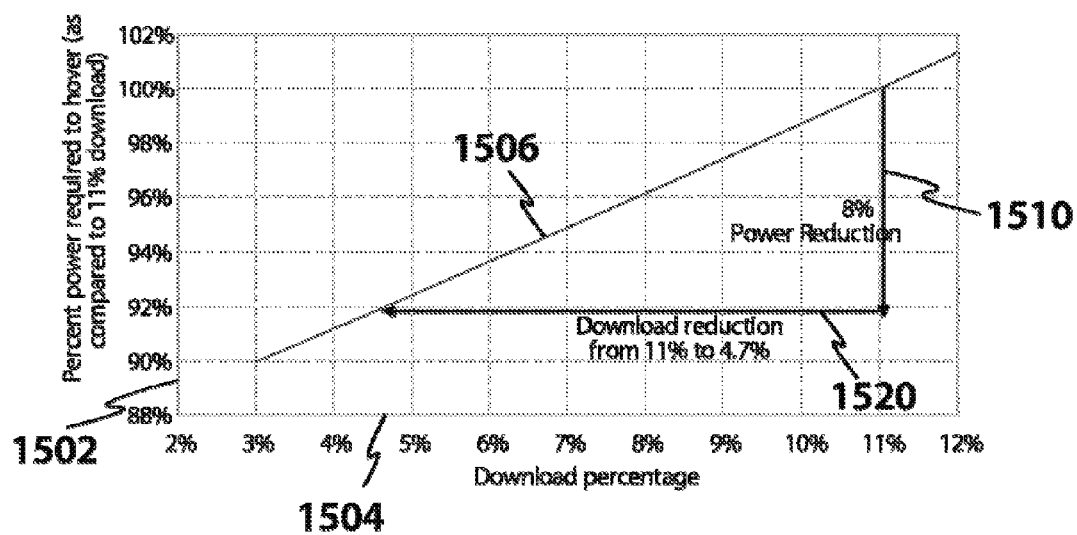
FIG. 15 is a graph showing power reduction from reducing download or increasing wing aspect ratio.

The high aspect ratio wing in preferred embodiments creates less blockage area and download force (an aerodynamic force produced by the rotor on a wing or fuselage that opposes the thrust of the rotor) in hover. Prior art tiltrotor designs, the Bell™ V-22 and Bell™ BA609, had download of 11% and 9%, respectively. The TR53 includes a trailing edge flap of 40% of the wing section chord, which is calculated to provide a total download of 4.7% using the computational fluid dynamics code ANSYS™ Fluent. This trailing edge flap is further optimized to reduce download. For comparison with the prior art, a download reduction from 11% to 4.7% translates to 8% reduction in required installed power, as illustrated in FIG. 15. FIG. 15 is a graph with the hover power required on the vertical axis 1502 and download percentage on the horizontal axis 1504. The calculated relation 1506 shows that the TR53 download reduction 1520 yields an 8% power reduction 1510.

The TR53 uses a tilting outboard wing as taught in U.S. patent application Ser. No. 11/505,025, which creates almost no download on the outboard wing during hover and further increases the overall wing aspect ratio. The outboard wing airfoils are optimized for efficient cruise at acceptable thickness ratio, and also to provide the low aerodynamic buffet level during conversion flight from helicopter mode to wing borne flight, by using leading edge slats and trailing edge flaps. This design improvement is useful because buffet can be objectionable to passengers as well a source of fatiguing loads for the nacelle system and wing and fuselage structures.

The high aspect ratio wing used to provide efficient cruise flight in preferred embodiments accelerates flow on the top surface of the wing, creating a differential velocity, or wash, field in front of the wing. This accelerated flow over the top of the wing creates higher Mach numbers for prop-rotor sections rotating through the top-half of a rotation, making the airfoil design problem even more important on the prop. Thus, method aspects of the present inventive subject matter are contemplated wherein the wing geometrical design and rotor blade geometric design are modified using the aid of computational fluid dynamics (CFD) simulations including the presence of both the wing and rotating rotor. Such CFD simulation shows that sustained flight of the TR53 at speeds of Mach 0.65 and wing loadings of 60, 80, 100, or 120 pounds per square foot is viable.

Still further, it is contemplated that the relatively large wing size of the TR53 supports cruise flight at 41,000 feet. This cruise altitude is 16,000 feet higher than the prior art Bell™ V-22 and Bell™ BA609 as well as most turboprop aircraft. Such a relatively large wing size enables the aircraft to cruise higher and faster while maintaining high engine operating efficiency by substantially increasing the configuration lift-to-drag ratio.

Aerodynamic Efficiency—Low Drag Fuselage

The fuselage drag of the TR53 is an important consideration both for achieving high speed and high efficiency.

As compared to the smaller prior art Bell™ BA609 scaled to the same fuselage diameter, the TR53 is currently contemplated to have a smoothly shaped nose that reduces drag, as shown in FIG. 6.

Additionally, the shaping of the aft section of the fuselage, often called the boat tail, is important. In the TR53, the aft section is not shaped like most prior art rotorcraft, tilt-rotors, or other vertical takeoff aircraft. Instead, the TR53 aft section has a shape similar to that of transport aircraft designed to cruise at Mach 0.8 including for example the Airbus™ A320. FIG. 6 shows the gentle upsweep of the fuselage aft section, with an average angle of about 14° as measured at the lower outside mold line of the fuselage.

Figure 16:
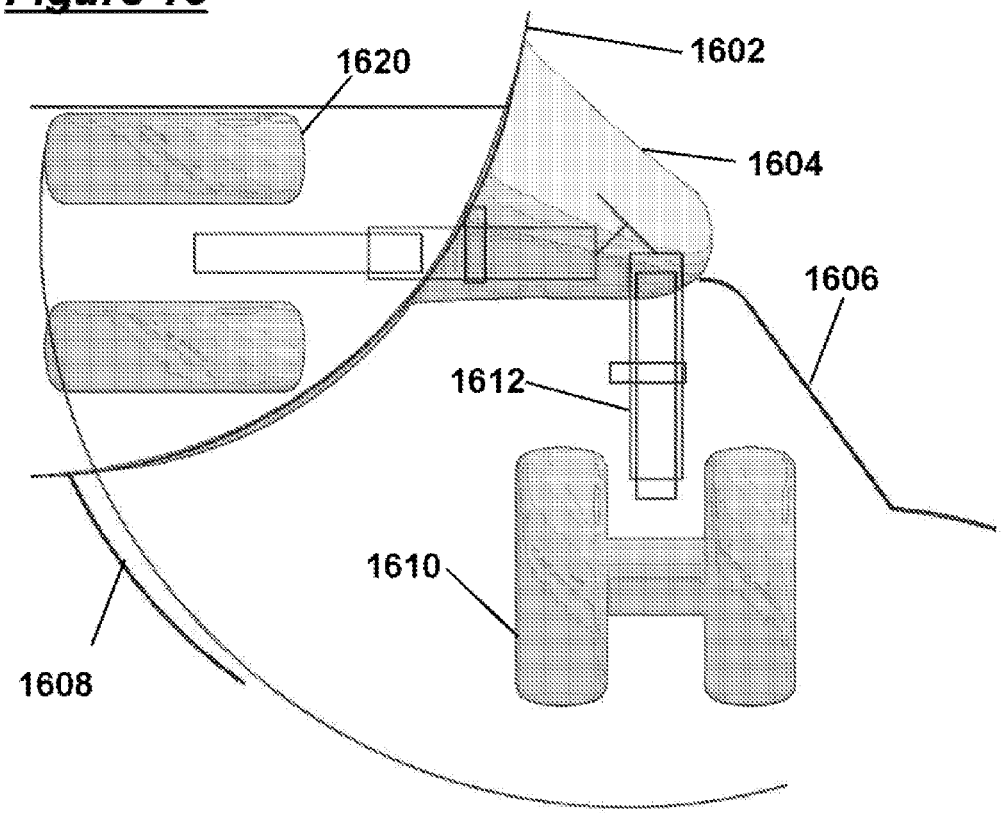
FIG. 16 is a schematic of a preferred aircraft landing gear.

While a high wing configuration provides a lower drag and higher lift-to-drag ratio contribution than a low wing configuration, the need to enclose, or fair, the main landing gear adds a fairing drag. The TR53 combines a unique low drag main landing gear supporting structure, landing gear doors and a stub wing-like fairing. FIG. 16 shows a preferred main landing gear supporting structure and landing gear doors 1606, 1608 retracting into the stub wing-like aerodynamic fairing 1604 that is coupled to a fuselage 1602. The extended landing gear 1610 and arm with shock absorbers 1612 retract into a retracted position 1620.

An area-ruled wing-fuselage fairing is used to reduce the aerodynamic drag arising from the junction of the wing and fuselage. Embodiments (not shown) are also contemplated that increase the wing root chord to effectively reduce the wing thickness ratio at the fuselage junction, which can alleviate high Mach effects.

The TR53 fuselage has a fineness ratio, defined as the ratio of the length of a fuselage to its maximum diameter, of approximately 8. This is much higher than prior art rotorcraft. The long, slender nature of the fuselage can be seen in FIG. 8. Preferred embodiments have fineness ratios of 6, 8, and even 10; these fineness ratios assists in providing relatively low drag beneficial for a high utility transport aircraft. Because prior art rotorcraft were relatively slow (cruise below Mach 0.45 and more typically Mach 0.15), there was little or no motivation to have a slender low drag fuselage, and certainly no appreciation of a need to have a high fuselage fineness ratio.

Aerodynamic Efficiency—Empennage Drag Reduction and Flight Control

Most prior art aircraft, both fixed-wing and rotary-wing, utilize an empennage, composed of aerodynamic tail surfaces, to maintain longitudinal and directional stability and flight control. However, as empennage area increases so does the aircraft drag. In the TR53, the total empennage surface area is only about 18% of the wing area. This is a significant improvement as compared to the tiltrotor prior art, for example the Bell™ V-22 tiltrotor, which has a total empennage wetted area that is about 105% of the wing area. Fixed-wing prior art usually also have higher empennage surface area to wing area ratios, as exemplified by the Bombardier™ Dash 8 Q400 at about 48% and the Piaggio™ Avanti at about 67%.

This dramatic reduction in empennage area for the TR53 stems from the aircraft's use of mast moment to assist in pitch stabilization and control and in directional stabilization and control of the aircraft, the latter aided by different nacelle tilt as necessary as described in U.S. Patent Application No. 61/044,429. Additional discussion of the enabling inventions that provide for this small tail area has been provided above in the discussion of aircraft structure and empty weight. This reduces the zero-lift drag of the TR53 by about 1% as compared to the 48% empennage-to-wing area ratio of the Bombardier™ Dash 8 Q400, and reduces the zero-lift drag of the TR53 by 3% as compared to 105% empennage-to-wing area ratio of the Bell™ V-22. The TR53 tail surfaces are sized to provide pitch trim in cruise flight without use of rotor mast moment and to provide yaw trim in the case that one rotor is feathered. The TR53 tail surfaces also provide a marginally stable aircraft configuration in pitch and yaw. While low static stability is of limited importance for an aircraft with very high control power in pitch and yaw (such as the TR53 when using rotor control moments), the avoidance of the large yaw stability of conventional aircraft greatly reduces the need to use rotor controls to fight the tendency to yaw into the wind (known as weather-cocking) of conventional tiltrotor aircraft when landing or taking off in strong cross winds.

Further, the TR53 is contemplated to use an advanced flight control system. U.S. Pat. No. 6,584,383 and U.S. patent application Ser. No. 11/506,571 teach systems and methods that can be used to improve aircraft flight safety and security and reduce of flight crew workload and training.

Method aspects of the preferred embodiments are contemplated whereby the aircraft can maintain pitch and directional control as well as maintain stability with the loss of some or all of the empennage through application of mast moments generated by one or more rotors. In the TR53, this feature is contemplated to be augmented with systems from U.S. patent application Ser. No. 11/506,044, which allows continuation of wing-born flight when one rotor or its drive system fails, and with systems from U.S. patent application Ser. No. 11/473,979. Taken together, these systems can provide a rotor fail-operation capability, high-redundancy roll control and tail redundancy in pitch and yaw, and therefore continued safe operation in many contingency scenarios. Without these features, it would be difficult for a tilt rotor aircraft could achieve the safety level required for large-scale commercial air transportation.

Aerodynamic Efficiency—Total Drag and Lift-to-Drag Ratio

The TR53 was developed with extensive use of computational fluid dynamics (CFD) solution approaches, including the aforementioned ANSYS™ Fluent, CDI™ CHARM, Overflow, and MSES tools. The use of these tools allows the prediction and verification of the performance of the present inventive subject matter. Further, in preferred embodiments, these tools are used for detailed configuration and aerodynamic shaping and optimization.

The aerodynamically efficient configuration of the TR53 is depicted in FIGS. 5, 6, and 7. Based on the use of the aforementioned simulation tools, the aerodynamic performance is computed; which shows a preferred lift-to-drag ratio of about 20 assuming turbulent free stream air conditions and thus a turbulent boundary layer, and a lift-to-drag ratio of 23 assuming favorable free-stream air conditions and extensive natural laminar flow when the aircraft is flying at a Mach number between 0.50 and 0.60. This represents a major step beyond the operational prior art of the Bell™ V-22 and Bell™ BA609, which are estimated to have peak lift-to-drag ratios below 8 at Mach numbers of around 0.45.

In software simulation of TR53 cruise flight at altitudes of 35,000-41,000 feet and Mach numbers between 0.60 and 0.65, a lift-to-drag ratio of about 18 is calculated when conservatively assuming a turbulent boundary layer. This result demonstrates the inherent efficiency advantage of flying the TR53 at Mach 0.65 with a straight wing (relatively increased wing span) as opposed to flying at a Mach number of 0.80 with swept wing (and relatively reduced wing span for which configuration one of ordinary skill in the art would expect a reduced lift-to-drag ratio).

Preferred aircraft are advantageously equipped with a combination of two, three or more features that allows the aircraft to achieve sustained cruise flight at a speed greater than Mach 0.5, 0.55, or even 0.6. These features include the rotor having a rotor blade with a quarter-span thickness ratio of less than 20%, 22%, 24%, or 26%, the wing airfoil with a thickness ratio less than 19%, 20%, 21%, 22%, or 23%, but preferably between 19% and 22%, a nacelle having a spinner with a concave region with a diameter that is reduced by 5% or more from a maximum spinner diameter, and a turbine engine sized and dimensioned to provide sufficient power to overcome an aerodynamic drag of the aircraft at that speed. A quarter-span thickness ratio is the rotor blade 25% radial station airfoil thickness-to-chord ratio.

Embodiments are contemplated in which a tiltrotor has a more swept wing than the TR53. It is well known that sweeping a wing increases the high Mach performance of that wing. In tilt-rotors, it is desirable to have the wing quarter-chord and the helicopter-mode rotor rotation center be in line with the vehicle center of gravity. To accomplish this in a more highly swept wing, the wing could be swept in a W-shape; sweeping the inboard portion of the inboard wing backwards, then reversing the sweep angle of the outboard portion of the inboard wing. Alternatively, the wing could be swept first forward then backwards. Making a tiltrotor wing in a W-configuration will require additional section thickness and will add complexity and cost. Thus, wing sweep is not the only factor limiting aircraft forward speed. With a low disc loading rotor with thick blades and transonic effects at the blade roots, achieving efficient cruise Mach numbers much higher than 0.70 is a challenge. In such an embodiment, a wing segment could have a leading edge sweep angle of 15°, 20°, or even 35°.

There is an additional positive interference effect of the TR53's rotating propellers that further decreases the drag due to lift, known as induced drag. Performance estimates of the TR53, including calculation of the vehicle lift-to-drag ratio, are based on computational fluid dynamics computations, including the effects of the turning rotors.

It is interesting to compare a TR53 with a Boeing™ 737-600 jet transport. These two aircraft have fuselages of comparable size, and could carry similar payloads. It is contemplated that the TR53 will be so efficient that it could be commercially competitive with the Boeing™ 737-600 on many routes.

Propulsion Efficiency

In general, it is difficult to make a single rotor operate efficiently in both hover mode and cruise mode. In the TR53 this is accomplished in large measure by altering the speed of the rotor.

The TR53 is designed to achieve a thrust ratio of approximately 35:1 between low-altitude hover flight (where 175,000 lb of vertical lift is required for helicopter-mode maneuver including blade stall margin) and low altitude cruise flight (where only 5000 pounds of thrust is required), and possibly 10:1 in other flight conditions. This is accomplished by varying the rotor speed sufficiently to maintain a relatively high blade loading (distributed sectional lift coefficient) and rotor efficiency $\eta_p$, in cruise mode.

An aircraft that has rotors sized and positioned to lift the aircraft vertically means that the aircraft is capable of substantially vertical takeoff at sea level using thrust generated by spinning rotors. In practice, such rotors must be of adequate diameter to provide sufficient lifting force.

An aircraft having a rotor has an operational maximum rotational speed (usually given in rpm) associated with that rotor. As used herein the term "operational maximum rotational speed" is the maximum steady speed at which a rotor can safely rotate during takeoff. In practice, the operational maximum rotational speed of a rotor might be set by structural integrity limits, vibration limits, power limits, stability or dynamic limits, gearbox limits, drivetrain limits, drag limits, noise limits, or some other concern. Realistic aircraft typically have rotor operation limits noted on cockpit instruments, pilot controls, flight manuals, design documents, or elsewhere. For a version of the TR53 with a Rolls-Royce™ AE1107C engine, the operational maximum rotational speed is calculated to be about 285 rpm. In contemplated hovering flight, the TR53 could fly with substantial payloads at rotational speeds of 250, 270, or 285 rpm. In contemplated cruise flight, the TR53 could fly with a rotor speed of 130, 145, or 160 rpm. Naturally, these rotational speeds are merely examples, and many other rotational speeds might be achieved depending on the flight condition.

Figure 17:
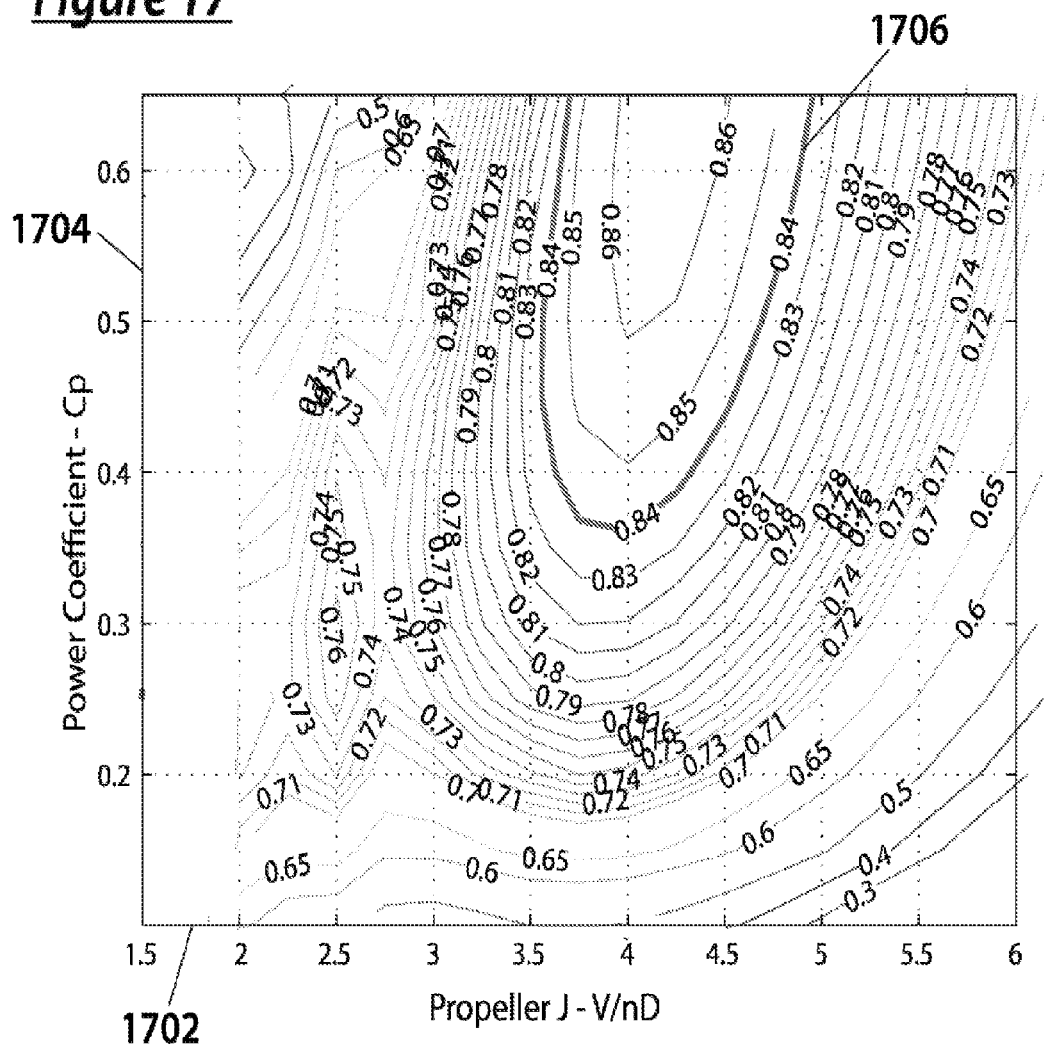
FIG. 17 is a graph showing efficiency of a preferred rotor and showing that high efficiency can be maintained by varying rotor speed.

The preferred rotor and drive train for the TR53 is designed to operate at 49% of maximum rpm for efficient cruise (long-range flight) and down to 26% of maximum rpm for loiter (long endurance flight). As an example, a TR53 might cruise at high altitude with a reduced rotational speed of 44% of the operational maximum rpm, calculated to correspond to 50% of the maximum lift coefficient of a working section of a rotor blade, which provides good propeller efficiency. Rotor propulsive efficiency is shown in FIG. 17, which is a graph of the result of a computational fluid dynamics simulation of a preferred rotor, where the horizontal axis 1702 is the propeller advance ratio and the vertical axis 1704 is the propeller power coefficient. FIG. 17 is a calculated rotor efficiency map at Mach 0.60 assuming fully turbulent flow, showing that a large plateau 1706 of rotor efficiency above 84% is available. The use of variable rotor speed allows the operator to select values of advance ratio and power coefficient to continually stay inside this plateau 1706 over a wide range of flight speeds and altitudes. Further, the rotor is calculated to be capable of efficient operation at higher Mach numbers as well, here at up to 84% efficient at Mach 0.65 with some laminar flow.

In summary, a rotor system can advantageously vary its rotational speed to maintain a relatively high propulsive efficiency. However, known turboshaft engines are unable to maintain high efficiency over an equivalent rotor speed range. For this reason, the TR53 utilizes a 2-speed transmission with 1.75:1 gear ratio to maintain a low rotor speed but a relatively higher engine speed. Aspects of preferred speed-changing systems and methods are described in U.S. patent application Ser. Nos. 11/473,978 and 12/399,291. Other aspects of preferred drive trains and transmissions are described in U.S. patent application Ser. Nos. 11/473,969 and 12/399,594.

Preferred aircraft are advantageously equipped with an engine and drive train capable of operating the rotor at a cruise rpm of 70% to 75%, 50% to 60%, or even 30% to 50% of the maximum rpm in hover. It is known that turboshaft engines can operate over some range of output rotational speeds, for example, 60% to 100% of an engine maximum rotational speed. The extraordinarily wide output speed range of preferred rotors and drive trains implies that the engine either be able to operate over an extraordinarily wide speed band (of which known prior art turboshaft engines are not capable) or that the aircraft be equipped with a multiple-speed ratio gearbox.

One preferred engine for the TR53 is the Rolls-Royce™ AE1107C. However, since it any suitable engine or engines could be used to power the contemplated rotorcraft, the discussions of Specific Fuel Consumption (SFC) herein is made with respect to both current production engines as well as advanced engines. Current turboshaft engines lag in performance behind their large turbofan counterparts. The highest performance turboshaft engine currently entering production is the European EPI™ TP400-DG, which provides 11,000 horsepower at sea level and estimated cruise SFC of 0.36 pounds of fuel per horsepower-hour. With this SFC figure, the TR53 is calculated to provide an estimated thrust SFC of 0.44 pounds of fuel per pound thrust-hour at a cruise speed of Mach 0.65. Using modern turbofan technology, the TR53 is calculated to provide a thrust SFC of 0.40 pounds of fuel per pound thrust-hour at a cruise speed of Mach 0.65.

Integrated Cruise Efficiency

Achieving a high cruise performance in a tiltrotor is a formidable challenge. In order to hover the vehicle out of ground effect and maintain a degree of hover capability with one engine inoperative, the vehicle must have a large total installed power. However, if the vehicle is aerodynamically efficient with a high lift-to-drag ratio, a small percentage of the total installed power is needed for cruise. Varying the rotor speed is a step towards overcoming this gap, but the increased rotor driving torque must be accommodated in the vehicle and drivetrain design. Further, in turbine engines, varying the engine output rotational speed tends to reduce the engine efficiency and increase the engine specific fuel consumption, driving down overall cruise efficiency. Lower air densities at increasing cruise altitudes can be leveraged to offset this effect. However, in order to cruise at a higher altitude, a larger wing and high $M^2C_L$ limit are needed. As has been described herein, the TR53 creatively combines design elements to achieve efficient cruise performance and a robust hover out of ground effect capability.

For a TR53 cruising at Mach 0.65 above 36,000 feet (372.7 knots) at a weight of 100,000 pounds and at L/D=20, the drag is estimated to be 5,000 pounds, and power required for cruise is calculated to be 5,723 horsepower. With a thrust SFC of 0.4 pounds of fuel per pound thrust-hour, the fuel consumption would therefore be 2,289 pounds per hour or 6.14 pounds per nautical mile.

For units more popular in ground transportation, with a fuel density of 6.8 pounds per gallon and converting units into statute miles, the TR53 is calculated to cruise at 0.78 gallons per mile or 1.28 miles per gallon with 120 seats. Compared to a family car with 5 seats, this would be equivalent to 29 miles per gallon per 5 seats at 430 miles per hour and 36,000 to 41,000 feet.

It is contemplated that a TR53 cargo version would have a lower operating empty weight (estimated at 43,000 pounds) because the strengthened floor for carrying cargo is substantially lighter than the windows, seats and other amenities for carrying passengers.

A contemplated civil cargo version would be capable of carrying up to 42,000 pounds of cargo to a range of 5,000 nautical miles. That vehicle is estimated to have a normalized cruise efficiency (tons of payload times nautical miles of range divided by pounds of fuel burned divided by engine specific fuel consumption expressed in pounds of fuel burned per horsepower per hour) of 9.87 with 42,000 pounds of payload when flown to an average of 2,000 nautical miles. That represents a large improvement over the prior art.

Preferred aircraft have a maximum range of at least 1000, 1500, 2000, 2500, or even 3000 miles carrying its maximum payload. Viewed from an alternative perspective, preferred aircraft have a fuel capacity sufficient to fly at least 1000 miles, carrying at least 40%, 50%, 70%, or even 100% of its maximum payload, without refueling and after taking off vertically. As used herein, the term maximum range means the maximum distance an aircraft can travel without refueling after taking off vertically.

Vibration, Dynamics, and Noise

The TR53 is designed to achieve similar levels of comfort in terms of noise and vibration as conventional fixed-wing turboprop aircraft.

Method aspects of the present inventive subject matter are contemplated that allow for vibration reduction. For the TR53, this is achieved by using the primary flight control system for vibratory load alleviation in different flight modes. In wing-borne forward flight of the preferred embodiment, cyclic pitch control is used to counteract the effects of the wing wash field on the turning rotor. Higher-harmonics of blade pitch can also be used, as the TR53 is designed with provision for individual blade control. Similar methods are applied in rotor-borne flight of preferred embodiments. Additionally, noise levels are reduced with a combination of blade tip shaping, lowered rotor rpm and reduced thickness blade sections, especially in the outboard sections of the blade.

For the TR53, it is contemplated that interior noise could be reduced by using a high aspect ratio inner wing that places the rotor further away from the fuselage than the minimum geometric constraint, as shown in FIG. 7.

As part of the design process of the TR53, the structure is analyzed to be free of aeroelastic instabilities and other structural dynamic problems. This analysis is performed using CAMRAD™ II software. The inputs to this analysis and design process used for the preferred embodiments are the details of the aircraft structure and geometric and aerodynamic characteristics as described above. Using this analysis and design approach, it was determined that TR53 has a wing design and rotor design sufficient to remain free of whirl flutter throughout the flight envelope.

Design for Growth

For the TR53, the rotor is of 53 foot diameter, while the wing, hub, gearbox, and actuators are advantageously designed to have the capacity to accommodate a 56 foot diameter rotor. When the airframe is equipped with a 53 foot rotor, this additional spacing between the loaded blades and passenger fuselage reduces noise and annoyance for passengers. However, it is envisioned that the TR53 could be upgraded with a larger 56 foot diameter rotor that would allow for expanded aircraft capability and performance.

In an especially preferred embodiment, the rotors of the TR53 can be upgraded from a 53 foot diameter to a 56 foot diameter by simply changing the blades. This is due to the relative over-design on the hub, actuators, gearbox, and nacelle. Thus, the TR53 design works well with 7,000 horsepower per engine as describe herein, but the design is also calculated to work well with 12,000 horsepower per engine, with the larger engines being either of current or advanced technology. The TR53 fuselage has a cross section similar in size to that of the prior art Airbus™ A318, preferably equipped to transport six passengers abreast. This fuselage could be stretched to accommodate 210 passengers or more, in a similar manner to the stretch of the prior art Airbus™ A318 to the prior art Airbus™ A321 fixed-wing jet transports. Use of OSTR technology allows for stretching a vertical takeoff transport aircraft because high mast moment capability is needed to accommodate aircraft center-of-gravity offsets and to precisely maintain fuselage attitude. Finally, the use of OSTR rotors and a multiple-speed transmission creates unique growth options. In general, the transmission torque limit for such a vehicle is set by the cruise condition, when the output rotational speed is low and the torque is high. In hover, the power requirement is high, but the torque is lower because of the higher output rotational speed. Thus, additional engine power can be easily accommodated in the aircraft.

The same principles that provide the TR53 with high efficiency in hover and forward flight could also be applied on a larger aircraft. For example, a tiltrotor that is approximately 1.414 times the linear scale of the TR53 would result in an aircraft having 75-foot diameter rotors. Approximately twice the installed power would be needed, which could be accommodated by doubling the number of engines.

Other Aspects

One skilled in the art will appreciate that the teachings herein can be viewed from many other aspects.

Viewed from one such additional aspect, preferred embodiments of contemplated aircraft comprise a high efficiency tilting rotor and wing design that enable both vertical takeoff and efficient cruising such that the aircraft can be commercially competitive with runway dependent aircraft operating in a range of 100 to 1000 or more miles.

Commercially viable embodiments are likely to have at least two tilting rotors, and a wing design that both supports the rotors and is highly efficient. In especially preferred embodiments, the wings have sufficient aspect ratio and wing area to maximal fuselage cross sectional area ratio to provide a cruise lift-to-drag ratio of 13 to 26 or even 15 to 30.

Also, improvements to efficiency include one or more of a wing sweep of less than 15°, 13°, or even less than 10°, and a thickness ratio of less than 26%, 23% or 21%, configured in a combination sufficient to achieve a cruise lift-to-drag ratio of least 13 at a Mach number of 0.6. Combinations are especially contemplated that achieve that desired lift-to-drag ratio at Mach number 0.65.

Viewed from another aspect, an inventive propulsion system of an aircraft is designed to be efficient in both a hover mode of the aircraft and in a cruise mode of the aircraft. This propulsive efficiency is advantageously combined with a vertical takeoff empty weight fraction could be less than 0.55, less than 0.50, or even less than 0.45. The propulsion system can advantageously comprise a tilting rotor structured to have a hover Figure of Merit of at between 0.83 and 0.90 at a disc loading of at most 20, 30, 40, 50, 60 or 70 pounds-per-square-foot at sea level and in standard atmospheric conditions. Furthermore, the tilting rotor can be advantageously structured to a have cruise propulsion efficiency at between 0.82 and 0.92 at a flight speed of Mach 0.6 and cruise altitude while producing at most 5% of the maximum rotor hover thrust in hover at sea level and in standard atmospheric conditions.

Prior art tilt-rotors can operate in the range from 83 to 100% of maximum rpm. Preferred propulsion systems according to the present subject matter can comprise an engine and drive train that operates the rotor in cruise flight at an rpm of at most 70% of the maximum rpm in hover, in some cases 40-45%, 45-50%, 50-55%, 55-60% 60-65% and 65-70%.

The tilting rotor blade root thickness is considered to have a significant effect on cruise efficiency at high Mach. In preferred embodiments, the rotor blade root thickness ratio is less than 25%, 22% or even 20%. This can yield a cruise propulsion efficiency of at least 0.85, at least 0.88 and at least 0.90. A corresponding hover Figure of Merit can realistically be at least 0.85, at least 0.87 and at least 0.89.

Viewed from yet another aspect, an aircraft having a cruise effective lift-to-drag ratio of at least 13 at a flight Mach of 0.50, or even 0.60 (which historically has precluded vertical take off aircraft), can be improved by adding rotors that lift the aircraft.

Viewed from still another aspect, methods of providing a vertical takeoff transport aircraft with improved normalized cruise fuel productivity comprise providing the aircraft with an efficient tilting rotor, a variable speed engine and drive train, and a low empty weight fraction. In preferred embodiments, the normalized cruise fuel productivity can be between 5.0 and 12.0, and more preferably 7.0 and 12.0 (tons of payload×nautical miles of range divided by pounds of fuel burned divided by engine specific fuel consumption expressed in pounds of fuel burned per horsepower per hour).

Additional methods for providing a vertical takeoff transport aircraft with improved normalized cruise fuel productivity include providing an inboard wing supporting the tilting rotors. The wing can advantageously be mechanized by constructing it with sweep of less than 5°, 10°, or even 15° in combination with a thickness ratio of less than 20%, 21%, 23%, or even 25%. Such a wing can be constructed to have a planform of size and shape in a combination sufficient to achieve a cruise lift-to-drag of least 11, 12, 13, 14 or 15 at a Mach number of 0.6 or even 0.65. One can also advantageously use an outboard wing to improve normalized cruise fuel productivity by increasing total wing lifting area, and thus the aircraft total lift/drag ratio. One could structure such an aircraft efficiently enough such that it could realistically have a maximal fuselage cross sectional area larger than 8%, 10%, or even 12% of wing area.

Normalized cruise fuel productivity can also be increased by efficient use of composite materials, and independently by: (a) employing a lower weight gearbox; (b) using a spinnion to replace a wing spar and a trunnion, and in other ways eliminating redundant structure, and (c) making other structural changes that reduce the empty weight of an aircraft. Preferred embodiments combine such methods to reduce the empty weight fraction of the aircraft to 55, 50, 45, or even 40%.

Viewed from another aspect, an aircraft can be designed to be highly efficient by an appropriate selection of aircraft components and by utilizing advanced design and analysis techniques, which allow the accurate prediction of an aircraft's physical behavior.

In addition, the aircraft can be designed to support a tilting rotor by a wing that is sized and dimensioned to support the aircraft at the maximum hover weight in cruise-mode flight at an altitude of 25,000, 30,000, 35,000, 40,000, or even 45,000 feet. This wing could be designed to have a geometric shape to provide a high maximum lift limit, or $M^2C_L$ limit, at a high cruise speed. It is contemplated that preferred embodiments could achieve a $M^2C_L$ limit of 0.30, 0.35, or even 0.40. It is envisioned that the wing can further be designed to have thin transonic wing airfoil shapes, of at most 25%, 24%, 23%, 22%, 21%, or even 20%, which would assist in achieving a wing section lift to drag ratio greater than 35, 45, or even 55 at a Mach number of 0.60, 0.61, 0.63, 0.65, or even 0.67.

Still further, the aircraft can be designed to drive the tilting rotor using a variable speed drive system. The drive system is preferably designed to be capable of operating the rotor at a cruise rpm of at most 40-45%, 45-50%, 50-55%, 55-60% 60-65% and 65-70%, 70-75% and 75-80% of the maximum rpm in hover.

The design of such an aircraft can be advantageously facilitated using computer simulation and numerical optimization, to modify the blade geometry of a tilt rotor to provide improved hover figure of merit and cruise propulsive efficiency. It is further contemplated that the computer simulation could numerically solve unsteady Navier-Stokes fluid flow equations on a finite volume grid around geometry representative of the aircraft and rotors.

Independently, it is envisioned that the computer simulation and geometry modification procedure could model any or all of the blade structural dynamics, blade deflection, and/or blade aerodynamics, including effects of the rotor trailed wake, wing structural dynamics, wing deflection, wing aerodynamics, and the interactional effects of these elements. One of ordinary skill in the art could utilize the teachings herein to advantageously configure the numerical optimization procedure to comprise reduction of a plurality of objective functions, wherein the objective functions comprise performance metrics in different flight modes and conditions.

It is also contemplated to use computer simulation and numerical optimization methods to modify a tiltrotor nacelle spinner geometry in a manner that improves aircraft efficiency by locally lowering Mach numbers at the inboard portion of the rotor blades. It is still further envisioned that such computer simulation could be configured to simultaneously compute aerodynamic effects of any or all of the wing, a mechanically coupled nacelle, and a mechanically coupled spinner on a blade of a tilt rotor operated by a propulsion system.

Viewed from a different aspect, a rotorcraft having multiple rotors capable of hovering the rotorcraft with disc loading between 10 and 70 pounds per square foot could be improved by adding a wing to support the rotors that also provides lift in forward flight. In preferred embodiments, the wing size and geometry is chosen to allow the aircraft to realistically cruise at a speed of Mach 0.6, 0.65, or even 0.67 at an altitude of at least 25,000, 30,000, 35,000, 40,000, or even 45,000 feet with a cruise lift-to-drag ratio of at least 11, 13, 15, 17, 19, 21, 23, 25, or even 27.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft, comprising
a propulsion system with a rotor that lifts the aircraft, and
the rotor having sufficient area to hover the aircraft with a rotor disc loading of at most 60 pounds per square foot at the maximum hover takeoff weight of the aircraft at sea level and standard atmosphere; and
wherein the rotor is configured to propel the aircraft in forward cruise speed of at least Mach 0.55 and a rotor speed less than 70% of maximum rpm in hover.

2. The aircraft of claim 1, further comprising a second rotor, wherein both the rotor and the second rotor are used for lifting the aircraft, and are tilting rotors.

3. The aircraft of claim 2, wherein the rotors operate together to supply the only propulsive forces in forward flight.

4. The aircraft of claim 1, wherein the propulsion system comprises:
a mechanism that tilts the rotor:
the rotor has dimensions that provide a hover Figure of Merit of between 0.83 and 0.90 at the disc loading; and
the dimensions also provide the rotor with cruise propulsion efficiency at between 0.83 and 0.92 at a flight Mach of 0.6 while producing at most 5% of the maximum rotor thrust in hover at sea level and standard atmosphere.

5. The aircraft of claim 1, wherein the rotor is configured to provide a cruise propulsion efficiency of at least 0.83.

6. The aircraft of claim 1, wherein the rotor is configured to propel the aircraft in forward cruise speed of at least Mach 0.6.

7. The aircraft of claim 1, wherein the rotor supplies the only propulsive force in forward flight.

8. The aircraft of claim 7, where the aircraft has a configuration that achieves a cruise lift-to-drag ratio of between 13 and 26 at a flight Mach of 0.65.

9. The aircraft of claim 7, where the aircraft has a configuration that achieves a level cruise speed of more than Mach 0.65.

10. The aircraft of claim 7, where the aircraft has a configuration that achieves a cruise lift-to-drag ratio of at least 13 at a cruise speed of Mach of 0.60.

11. The aircraft of claim 7, where the rotor disc loading is less than 50 pounds per square foot at the maximum hover takeoff weight of the aircraft.

12. The aircraft of claim 7, where the rotor disc loading is of less than 40 pounds per square foot at the maximum hover takeoff weight of the aircraft.

13. The aircraft of claim 7, wherein the rotor has a maximum blade root thickness ratio of less than 25%.

14. The aircraft of claim 7, further comprising a fixed wing with sufficient area to cruise at an altitude of at least 31,000 feet.

15. The aircraft of claim 14, where the fixed wing has an aspect ratio of at least 10.

16. The aircraft of claim 14, where the improvement further comprises a fuselage having a cross sectional area between 10%-15% of a planform area of the fixed wing.

17. The aircraft of claim 7, wherein the rotor has a disc loading of no more than 30 pounds per square foot.

18. The aircraft of claim 7, wherein the rotor has a disc loading of no more than 20 pounds per square foot.

* * * * *